(12) United States Patent
Bass

(10) Patent No.: US 7,980,925 B2
(45) Date of Patent: Jul. 19, 2011

(54) FISH PROCESSING DEVICE

(75) Inventor: Richard Bass, Sheldon (AU)

(73) Assignee: Richard Bass Pty Ltd, Queensland (AU)

( * ) Notice: Subject to any disclaimer, the term of this patent is extended or adjusted under 35 U.S.C. 154(b) by 0 days.

(21) Appl. No.: 12/602,824

(22) PCT Filed: Apr. 4, 2008

(86) PCT No.: PCT/AU2008/000801
§ 371 (c)(1),
(2), (4) Date: Dec. 3, 2009

(87) PCT Pub. No.: WO2008/148155
PCT Pub. Date: Dec. 11, 2008

(65) Prior Publication Data
US 2010/0178859 A1      Jul. 15, 2010

(30) Foreign Application Priority Data
Jun. 4, 2007   (AU) ................................ 2007903009

(51) Int. Cl.
A22B 3/00         (2006.01)
(52) U.S. Cl. .......................................... 452/57
(58) Field of Classification Search .............. 452/57–59, 452/61, 62
See application file for complete search history.

(56) References Cited

U.S. PATENT DOCUMENTS 6,183,356 B1 *   2/2001   Middleton et al. .............. 452/57
6,769,976 B2 *   8/2004   Bass ............................... 452/62
7,220,177 B2 *   5/2007   King et al. ...................... 452/62
7,575,507 B2 *   8/2009   King et al. ...................... 452/57

FOREIGN PATENT DOCUMENTS

| EP | 917823 B1 | 7/2001 |
|---|---|---|
| WO | 97/01285 A1 | 1/1997 |
| WO | 98/44805 A1 | 10/1998 |
| WO | 99/46997 A1 | 9/1999 |
| WO | 01/97621 A1 | 12/2001 |
| WO | 2004/049810 A1 | 6/2004 |
| WO | 2005/089558 A1 | 9/2005 |

* cited by examiner

*Primary Examiner* — Richard Price, Jr
(74) *Attorney, Agent, or Firm* — Mark D. Miller

(57) ABSTRACT

A device for processing fish, the device comprising: an open channel through which a fish can pass; a fish processing means associated with the channel; a vertical guide plate pivotally mounted on each side of the channel, having a firing position and a retracted position; a mechanism for moving the fish processing means from a ("firing position") to a position which allows passage of the fish through the channel after processing ("retracted position"); a mechanism for pivoting each guide plate between the firing and retracted positions ("guide plate pivot mechanism"); a trigger that when contacted by the head of the fish activates the fish processing means; and a mechanism for resetting the device after the processing of a fish, wherein the resetting mechanism is in communication with the trigger and wherein actuation of the mechanism by the trigger facilitates: activation of the fish processing means; movement of the fish processing means and guide plates from their respective firing positions to their respective retracted positions; return of the fish processing means and the vertical guide plates to their respective firing positions after they have attained their retracted positions; and priming of the at least one fish processing means.

30 Claims, 15 Drawing Sheets

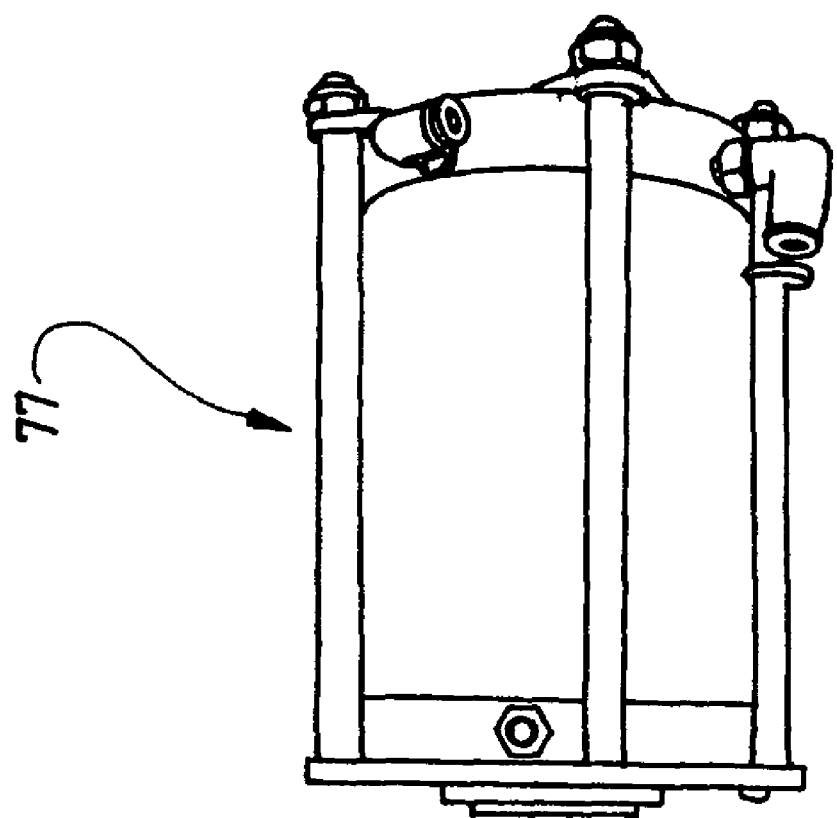
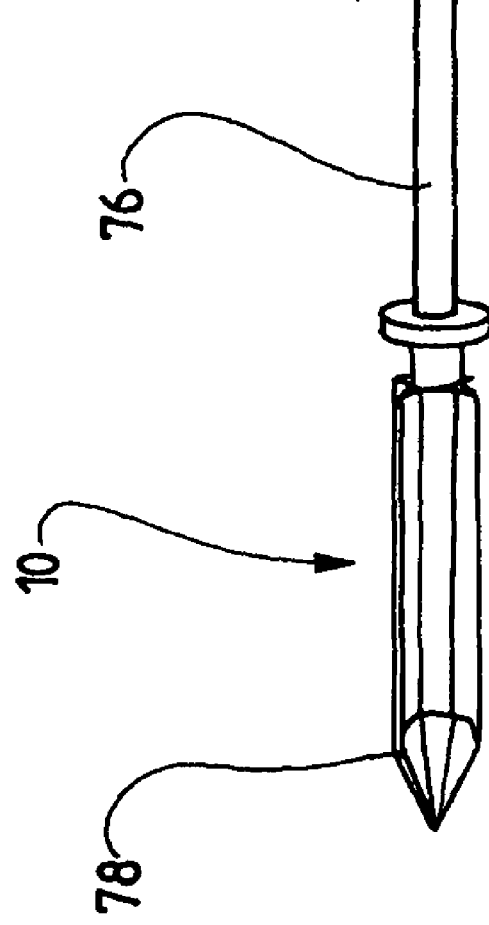
Fig. 10

FISH PROCESSING DEVICE

TECHNICAL FIELD

The invention described herein relates to devices and methods for processing fish. In particular, the invention is directed to a device and method for the automated processing of fish although the scope of the invention is not necessarily limited thereto.

BACKGROUND ART

A pneumatically-powered device suitable for stunning fish is described in International Application No. PCT/AU2005/000412 (Publication No. WO 2005/091558) by the present applicant. This device can be efficiently used for the stunning of large numbers of fish in an automatic, flow-through fashion and is incorporated herein by cross reference.

The operating principle of the stunning device according to the invention described in WO 05/091558 involves the killing of the fish by a blow to the head that is administered by the piston of the gun. Activation of the piston results from the head of the fish contacting the trigger. The trigger and piston are configured such that when the piston is activated, it strikes the fish just behind and/or between the eyes. This impact is sufficient to kill the fish due to the shock to the brain. After the fish has been killed by the force of the piston, the gun assembly, the trigger which typically comprises a contact plate, and vertical guide plates pivot from the set point to a retracted position, wherein the retracted position is sufficient to allow the stunned fish to pass beyond the set point. On passage of the fish out of the channel of the device, the fish activates a sensor that in turn activates the pivot mechanisms and returns the gun assembly, trigger and vertical guide plates to the set point, thereby effectively resetting the device.

This device is extremely efficient at stunning large numbers of fish and has achieved considerable commercial success. In some circumstances, however, the device performs an unwanted operation which is known in the trade as "hammering". "Hammering" occurs when a processed fish has not completely exited from the device before the gun assembly, trigger and vertical guide plates move from the retracted position to the set point. When this happens the trigger contacts the processed fish in the course of its downward trajectory, resulting in the activation of the gun and pivot mechanisms before the gun has reached the set point. As a consequence the processed fish suffers multiple piston strikes, resulting in damage to the vendible portions of the fish. Elimination of this unwanted operation would therefore be an advantage.

Fish, such as salmon, require labour intensive preparation before sale. Typically fish are caught, stunned, bled and immediately placed in cold storage. Bleeding is an essential step in this process as it improves the appearance of the meat and enhances its flavour. Devices described in WO 2005/091558 are commonly employed on fish processing lines upstream of the bleeding step which is performed manually. Manual bleeding is a labour intensive process and is therefore a rate limiting step in the overall processing of the fish. A fortiori because of the speed with which fish are stunned by the device there is a considerable lag between stunning and bleeding which may affect the quality and therefore sale price of the meat. It will also be appreciated that before slaughter, fish in aqua-farms are typically tagged and/or inoculated. These tasks are also labour intensive and costly due to the number of man hours required to carry them out. Therefore, a device that comprises one or more fish processing means—for example a pneumatic gun and a pneumatic blade; a means for inoculating fish; or a means for tagging fish—and which can process large numbers of fish in an automatic, flow-through fashion would offer a considerable advantage to an operator of a commercial fishery.

It is an aim of the invention to provide a device, that operates in a similar manner to the device described in WO 05/091558, yet is significantly enhanced in that the device comprises: one or more fish processing means that can be used in an automated flow-through manner; and a mechanism that resets the device whilst avoiding the premature activation of the at least one fish processing means.

SUMMARY OF THE INVENTION

In a broad format, the invention provides a device for processing fish, the device comprising:

an elongate member comprising a floor and opposing walls forming an open channel through which a fish can pass;

at least one fish processing means associated with the channel, wherein the at least one fish processing means includes a member which can act on the body of the fish when at a set point in the channel, and wherein at least the member of the at least one fish processing means can be moved to a position which allows passage of the fish through the channel after being acted on by the member;

a vertical guide plate pivotally mounted on each side of the channel, having a firing position, wherein the end of a guide plate distal the pivotal mounting is at or near the set point and the pivotal mounting is between the set point and the channel entrance, and a retracted position, wherein each guide plate is near parallel to the side wall of the channel;

a mechanism for moving at least the member of the at least one fish processing means from a position at or near the set point ("firing position") to a position which allows passage of the fish through the channel after being acted on by the member ("retracted position");

a mechanism for pivoting each guide plate between the firing and retracted positions ("guide plate pivot mechanism");

a trigger that when contacted by the head of the fish at the set point activates the member of the at least one fish processing means; and a mechanism for resetting the device after the processing of a fish, wherein the resetting mechanism is in communication with the trigger and wherein actuation of the mechanism by the trigger facilitates:

activation of the at least one fish processing means;

moving of the least member of the at least one fish processing means and the pivoting of the guide plates from their respective firing positions to their respective retracted positions;

return of at least the member of the at least one fish processing means and the vertical guide plates to the firing position after the at least one fish processing means and guide plates have attained the retracted position; and priming of the at least one fish processing means.

Preferably, at least the member of the at least one fish processing means affects the anterior portion of the body of the fish, wherein said anterior portion encompasses the head and gill arches. More preferably, at least the member of the at least one fish processing means affects the brain and/or arteries leading from the heart.

Preferably, the guide plate pivot mechanism is an integral part of, or at least associated with, the mechanism for moving at least the member of the at least one fish processing means. More preferably, the mechanism for moving at least the member of the at least one fish processing means is a pivoting mechanism that pivots said member from the firing position to the retracted position and vice versa ("fish processing means pivot mechanism").

Preferably, the device further comprises a clamping means that prevents lateral movement of a fish relative the at least one fish processing means at the set point prior to processing. More preferably, the clamping means retains a fish in a position that allows the least member of the at least one fish processing means to contact a fish at the desired location. In a particularly preferred embodiment, the clamping means retains a fish in a dorso-ventral orientation along the centre of the channel. Typically, the clamping means is activated after the fish contacts the trigger and before activation of the at least one fish processing means; and deactivated after activation of the at least one fish processing means and before the at least one fish processing means and vertical guide plates start to pivot.

Preferably, the clamping means comprises:
  at least two opposing clamping members mounted in said channel; and
  an actuator means that facilitates the reciprocation of said clamping members between a release position and a clamp position.

Preferably, the clamping members form an integral part of the vertical guide plates, wherein said clamping members are plates that are pivotally mounted, along the vertical axis, to the ends of the vertical guide plates. In other embodiments, a clamping member forms an integral part of or is associated with the vertical guide plate. In a preferred embodiment a clamping member and a vertical guide plate pivot relative to one another. In a particularly preferred embodiment the pivoting of a clamping member relative to a vertical guide plate is controlled by a gearing means. Preferably, the gearing means is a toothed bracket connected to a clamping member. More preferably, the clamping member is a vertical plate pivotable about the same axis as the vertical guide plate. More preferably, the clamping members are actuated by a pneumatic ram that is in communication with a clamping member.

It will be appreciated that prior to the processing of a fish, the vertical guide plates and the clamping plates are located at the firing position forming a uniform vertical surface. It will also be appreciated that when the clamping plates are at the firing position they are in the release position.

Preferably, the clamping actuator means is in communication with the mechanism that pivots the vertical guide plates, such that activation of the actuator means causes the vertical guide plates to move from the set point towards the centre of the channel. In relation to those embodiments where the clamping members are plates that are pivotally mounted, along the vertical axis, to the ends of the vertical guide plates, it will be appreciated that as the distal ends of the vertical guide plates move towards the centre of the channel the clamping plates pivot, on contacting the body of a fish, from the release position to the clamp position. In the clamp position, the surface of each clamping plate is adjacent the surface of the body of the fish. It is preferable that the clamping plates contact the surface of the fish proximal the gill arch. Moreover, it is preferable that the end of a clamping plate distal the pivotal mounting is arciform. Typically, the clamping plates are spring biased to return to the release position.

The trigger typically comprises a contact plate having a switch associated therewith ("trigger switch"). The contact plate is contacted by the nose of the fish when at the set point, thereby actuating the switch which in turn activates the at least one fish processing means and the pivot mechanisms. The trigger switch can be any suitable switch; for example an electrical switch, magnetic switch or optical switch. Preferably, the trigger switch is a pneumatic valve.

Preferably, the resetting mechanism is in the form of a circuit, wherein said circuit comprises:
  at least one fish processing means;
  a clamping actuator means;
  a lifting means that is in communication with the pivoting mechanisms;
  a switch that is in communication with the trigger ("trigger switch"), which when actuated by the trigger causes activation of:
  the clamping actuator means;
  the at least one fish processing means; and
  the lifting means such that the at least one fish processing means and vertical guide plates pivot from their respective firing positions to their respective retracted positions;
  a switch that is actuated when the at least one fish processing means and vertical guide plates are at or near their respective retracted positions or at or near their respective firing positions ("reset switch"), wherein actuation of said switch at or near the retracted positions results in:
  de-activation of the lifting means such that the at least one fish processing means and vertical guide plates pivot from their respective retracted positions to their respective firing positions; and
  de-activation of the trigger switch such that said switch is prevented from activating the clamping actuator means, the at least one fish processing means and the lifting means;
and wherein actuation of the reset switch at the firing position causes:
  re-activation of the trigger switch; and
  the priming of the at least one fish processing means.

It will be appreciated by one of skill in the art that the circuit can be operated by any suitable means. Typically, however, the circuit will be pneumatically operated.

When pneumatically operated the clamp actuator means is a pneumatic ram comprising a piston.

When pneumatically operated, the lifting means is a double acting pneumatic ram comprising a piston. It will be appreciated that each stroke of the piston pivots the at least one fish processing means and vertical guide plates from the retracted or firing position. Preferably, the piston within the cylinder comprises an extendable rod, the distal end of which is attached to the reset switch such that movement of the reset switch is coextensive with the movement of the distal end of the rod. Preferably, the reset switch is actuated when the piston within the cylinder is at or near the end of each stroke. Actuation of the reset switch typically involves contact between the switch and a contact plate, wherein the contact plate is located at or near the position attained by the distal end of the piston rod after each stroke. It will be appreciated that when the piston is at or near the end of each stroke the vertical guide plates and the at least one fish processing means are at either the retracted or firing positions.

When the circuit is pneumatically operated the trigger switch preferably takes the form of a pneumatic valve comprising:
  a piston to which a rod is attached, wherein the piston travels within a sheath formed by the valve between a primed position and an activated position, wherein at the primed position:
    the distal end of the rod extends from the valve and is contacted by the trigger; and the piston is locked in the primed position until the at least one fish processing means and vertical guide plates are at or near the firing position;

and wherein actuation of the trigger by the head of the fish results in the movement of the piston from the primed position to the activated position causing:

activation of the at least one fish processing means; and activation of the pivoting mechanisms;

It will be appreciated that movement of the trigger will result in the concomitant movement of the piston by virtue of the contact that exists between the trigger and the distal end of the piston rod. It will also be appreciated that the piston will return to the primed position from the activated position once the at least one fish processing means and vertical guide plates are at or near the retracted position. Movement of the piston from the activated to primed position will typically be controlled by the reset switch. It will also be appreciated that once the piston has attained the primed position, said piston will be locked in that position until the at least one fish processing means and vertical guide plates are at or near the firing position. Locking and unlocking of the piston is preferably controlled by the reset switch. The locking of the piston acts to stop the premature activation of the at least one fish processing means and pivoting mechanisms if the trigger contacts the processed fish in the course of its downward trajectory.

When the circuit is pneumatically operated the reset switch is a pneumatic valve comprising a moveable rod, which reciprocates between a first position and a second position, whereupon attainment of the first position causes the unlocking of the trigger valve such that said valve can activate the at least one fish processing means, and whereupon attainment of the second position causes activation of the lifting means, which is typically a double acting pneumatic ram, such that the at least one fish processing means and vertical guide plates pivot from the retracted position to the firing position; and the locking of the trigger valve such that said valve is prevented from activating the at least one fishing processing means. Preferably, the first position is attained when the vertical guide plates and the at least one fish processing means are at a retracted position and the second position is attained when the vertical guide plates and the at least one fish processing means are at the firing position. Preferably, actuation of said valve is caused by a terminus of said reset valve rod contacting a plate located at or near the position attained by the distal end of the piston rod of the lifting means after each stroke.

Preferably, the circuit further comprises at least one time delay mechanism that controls at least one of:

the time between activation of the trigger switch and activation of the at least one fish processing means;

the time between activation of the trigger switch and the activation of the clamping actuator means;

the time between activation of the at least one fish processing means and activation of the lifting means;

the time taken for the at least one fish processing means and vertical guide plates to pivot from the firing position to the retracted position; and the time taken for the at least one fish processing means and vertical guide plates to pivot from the retracted position to the firing position.

Preferably, the circuit comprises all of the time delay mechanism described above. Preferably, the time delay mechanism is a pneumatic flow control. Typically, a fish processing means is controlled by a specific pneumatic flow control. It will be appreciated that said control can deactivate the fish processing means. This enables the operator of the device to activate or deactivate a specific fish processing means at will. This has the advantage that when a device of the invention, having for example two fish processing means—a pneumatic gun and pneumatic spike—is employed, the operator can de-activate one fish processing means without affecting the operation of the other. The circuit also preferably comprises a manual over-ride mechanism to allow manual resetting of the device. Moreover, a mechanism for counting the number of times the device resets will typically be incorporated into the circuit.

A device according to the invention can also include a lateral and upwardly angled plate which is abutted by the chin of the fish when at the set point. To allow passage of the fish past the set point after activation of the at least one fish processing means, the plate can pivot between raised and lowered positions. In the raised position, the plate supports the chin of the fish while in the lowered position, the plate rests flat against the floor of the channel allowing the fish to be carried on through the channel.

A mechanism is provided for pivoting the chin plate between the raised and lowered positions. Like the guide plate pivot mechanism, the chin plate pivot mechanism can be an integral part of, or at least associated with, the fish processing means pivot mechanism. Preferably, the pivot mechanisms are prevented from pivoting from the firing position before the firing of the at least one fish processing means by a locking means. It will be appreciated that if the pivot mechanisms are not locked at the firing position before the firing of the at least one fish processing means the momentum of a fish may cause the at least one fish processing means to move from the firing position. This may result in inefficient and/or unwanted processing of the fish.

A fish processing means can be a pneumatically-operated gun that is pivotally mounted in the channel, the gun comprising a pneumatic cylinder and piston, wherein the piston is connected to a cylinder striker which is retractably extendable from a sleeve on the cylinder and wherein the gun can pivot between a lowered firing position where the striker can stun the fish at the set point in the channel and a raised position where the fish can pass beneath the gun.

The pivoting of the gun is typically effected by providing a mounting for the gun which is connected to the channel at an appropriate point by a shaft which spans the channel walls. The fish processing means pivot mechanism is advantageously associated with the gun mounting. In a preferred embodiment, said mechanism comprises a crank that is provided on the shaft of the mounting to which crank a pneumatic ram is connected. Any means of pivoting the gun can be employed however.

Typically, the trigger is also connected to said mounting. Preferably, the distance between the contact plate of the trigger and the striker of the gun can be adjusted. This adjustment can be affected by any suitable means. It will be appreciated that to affect a deadly blow, the striker must strike the fish just behind and/or between the eyes. It will also be appreciated that the distance between the nose of a fish, which contacts the contact plate of the trigger, and the eyes of a fish is not a fixed length and may vary between different fish genera.

The gun mounting also comprises a plate that is normal the striker and contacts the forehead of the fish. This plate ("forehead plate") typically extends from a point adjacent the striker towards the shaft of said mounting and aids in the presentation of the fish to the set point. It will be appreciated that when the gun is at the firing position, the end of the forehead plate distal the shaft of the mounting is at or near the set point.

To prevent the gun mounting from moving from the firing position, when the forehead plate contacts a fish, it is preferable that the gun mounting further comprises a locking means, wherein the locking means is activated when the gun is primed for firing and deactivated when the gun has fired. It will be appreciated that when the locking means is activated the gun mounting is prevented from pivoting towards the retracted position and when the locking means is deactivated the gun mounting is free to pivot towards the retracted position. In a particularly preferred embodiment, the locking means is a pneumatic ram that is connected to a mechanism that pivots the gun mounting such that activation of the pneumatic ram stops the gun mounting from pivoting A pneumatically-operated fish processing means can also be an integral part of, or at least associated with, the chin plate. Preferably, the fish processing means associated with the chin plate is a blade driven by a pneumatic cylinder. The pneumatic blade is typically fixed normal to the chin plate and extends into and out of the channel through an aperture in said plate. Activation and therefore extension of the blade through the aperture occurs when the head of the fish is at the set point and the trigger is activated by the head of the fish. Preferably, activation of the blade occurs after the fish has been struck by the striker. It will be appreciated that when the head of the fish is at the set point, and the blade is activated, the blade penetrates the ventral region of the fish proximal the gill arch. This incision is designed to sever the major arteries leading from the heart, resulting in ex-sanguination. It will also be appreciated that the ventral region proximal the gill arch is difficult to penetrate due to the presence of cartilage and other connective tissue. To penetrate the fish the blade must be propelled with sufficient force. This is typically accomplished by incorporating into the device a blade driven by a pneumatic impact cylinder. It will also be appreciated that owing to differences in the anatomical scale of different fish genera the extent to which the blade penetrates the fish must be varied accordingly. Preferably, the blade is detachable, thereby allowing the operator to exchange a blunt and inefficient blade without having to replace the entire blade; thereby avoiding an extended period of operational down-time. The word "blade" is used here to describe any object capable of penetrating the body of a fish. The blade can be of any design or configuration but is preferably a spike.

It will be appreciated that a fish processing means can include any suitable means for the processing of a fish. It may include a means for stunning a fish, ex-sanguinating a fish, gutting a fish, inoculating a fish, tagging a fish, scaling a fish or cleaning a fish.

Preferably, a device according to the invention comprises a gun pivotally mounted in the channel and a pneumatic spike associated with the chin plate, wherein the fish is stunned at the set point before ex-sanguination. In another format devices of the invention are placed in series on a production line, one device comprising the stunning mechanism and the second device comprising the pneumatic spike, wherein stunning of the fish occurs before ex-sanguination.

A device according to the invention also preferably comprises two opposing members that aid in the presentation of a fish along its dorsal-ventral axis to the at least one fish processing means. Typically, the members are plates that are pivotally mounted at or near the entrance to the channel, wherein said plates pivot between a closed position and an open position and wherein said plates are biased towards said closed position. In the closed position, the distal surface of a plate relative the pivot point is normal to the side wall of the channel. It will be appreciated that when the plates are at the closed position, the channel of the device is constricted such that only a single fish oriented along its dorso-ventral axis can pass into the channel of the device. In the open position, the distal surface of the plate relative the pivot point is adjacent the side walls of the channel. The plates typically comprise a sheet of stainless steel but can comprise any suitable material. In a preferred embodiment the plates are arciform. It will be appreciated that arciform plates will have both a convex and concave surface. In the closed position the convex surface of the plate will face the entrance to the channel.

With regard to the components of the device, the channel typically comprises sheets of material forming the walls and floor of the same. Cross-pieces can be provided along the open (top) side of the channel plus strengthening members where device components are mounted to the channel. Preferably, the device further comprises a cover that is pivotally mounted to the channel.

It will be appreciated that guide plates—which, as a consequence of being on opposite sides of the channel, in effect form a chute—aid presentation of the fish to the gun in that they maintain the verticality and centrality of the fish. The mechanism for pivoting the guide plates can be an integral part of, or at least associated with, the gun pivot mechanism, or can be a separate mechanism.

It will be appreciated by one of skill in the art that the various mechanisms of a device according to the invention can be operated by any suitable means. Typically however, mechanisms are pneumatically operated in the same manner as the gun. Control of mechanisms is also typically pneumatic.

Passage of fish through a device does not require a carrier fluid as mucous and water on the surface of a fish acts as a lubricant. However, a stream of water passing through the device—which may occur during automated operation when a chute supplies fish to the device—does not adversely effect operation of the device provided that the stream does not interfere with sensor function.

Since gravity provides the energy for movement of the fish through the channel, tilting of the channel downwardly from mouth to exit is advantageous. Preferably, the device is tilted at an angle of at least 3°.

Components of the device can be manufactured from any suitable material but are typically manufactured from metals, or plastics where the latter is more appropriate. Preferred metals are stainless steel and brass. Stainless steel components are preferably electro-polished to provide superior corrosion resistance.

Devices according to the invention can be conveniently used with fish of commercial weight such as salmon, cod and tuna.

With devices according to the invention, fish to be processed can be rapidly and efficiently processed with minimal risk of injury to an operator since operation of devices can be automated. An additional advantage of devices according to the invention is that the external appearance of the animal or fish is not affected by the killing process. This is particularly important for sale of whole fish. The quality of fish is also enhanced through more rapid and humane killing at the point of harvest.

In order that the invention may be more readily understood and put into practice, one or more preferred embodiments thereof will now be described, by way of example only, with reference to the accompanying drawings.

BRIEF DESCRIPTION OF THE DRAWINGS

FIG. 10 is a perspective view of the pneumatic blade which is an integral part of the blade assembly.

For simplicity, air supply lines have been omitted from the drawings showing the device and device components. In drawings showing particular device components other components have been omitted for clarity.

DETAILED DESCRIPTION OF PREFERRED EMBODIMENTS

Figure 1:
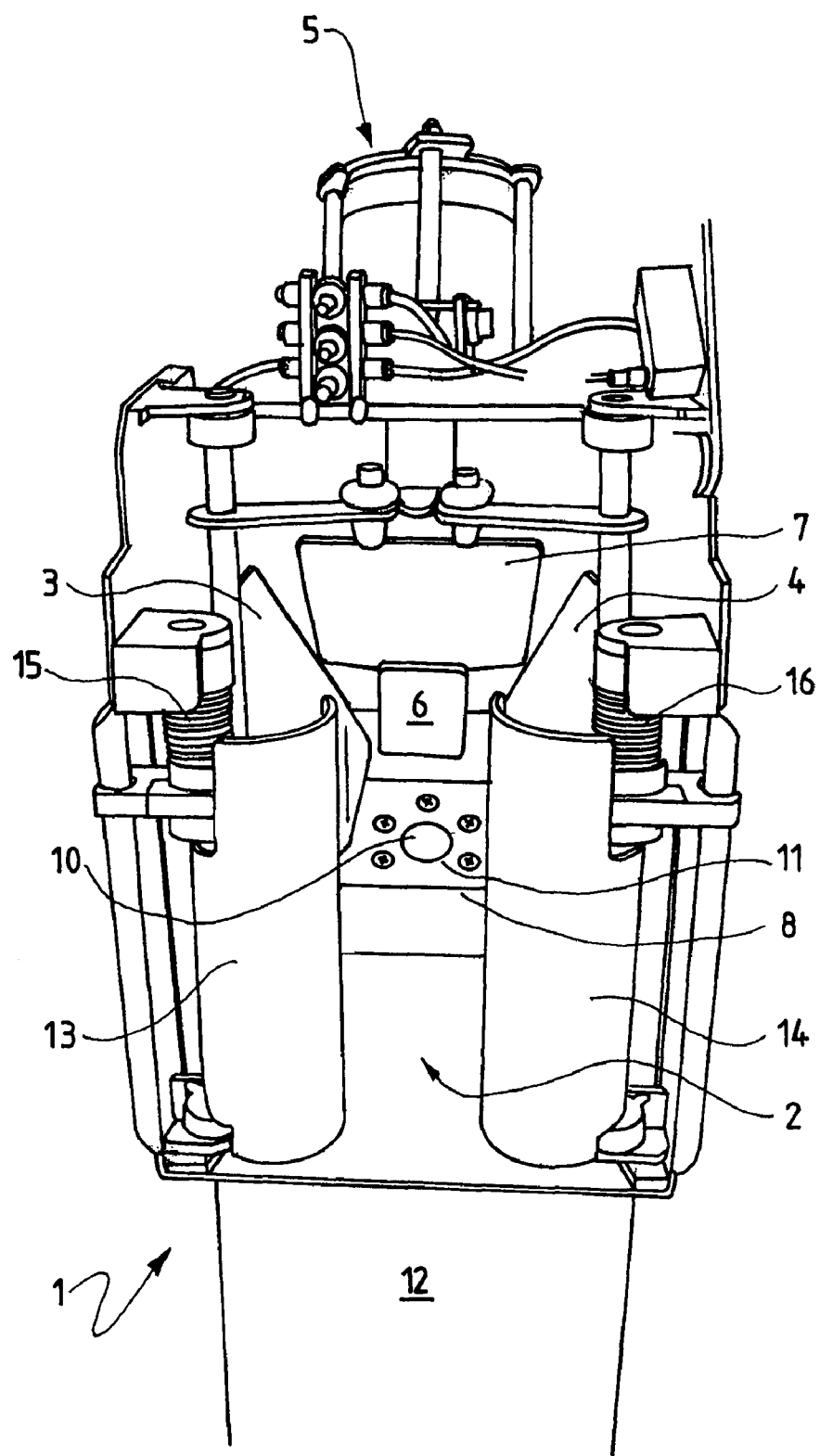
FIG. 1 is a perspective view of a device according to the invention in which the entrance to the channel is clearly visible.

With reference to FIG. 1, there is shown device 1, when at the firing position, comprising channel 2, vertical guide plates 3 and 4, gun assembly 5, trigger assembly 6, forehead plate 7, and chin plate 8. A pneumatic blade assembly 9, not shown in the drawing but to be described below is fitted to chin plate 8 and wherein blade 10 of said assembly enters channel 2 via aperture 11. Pneumatic blade assembly 9 is contained within cover 12. At the entry to channel 2 there is shown feeder plates 13 and 14 that are pivotally mounted to said channel and biased to return to the closed position by the action of springs 15 and 16.

Figure 2:
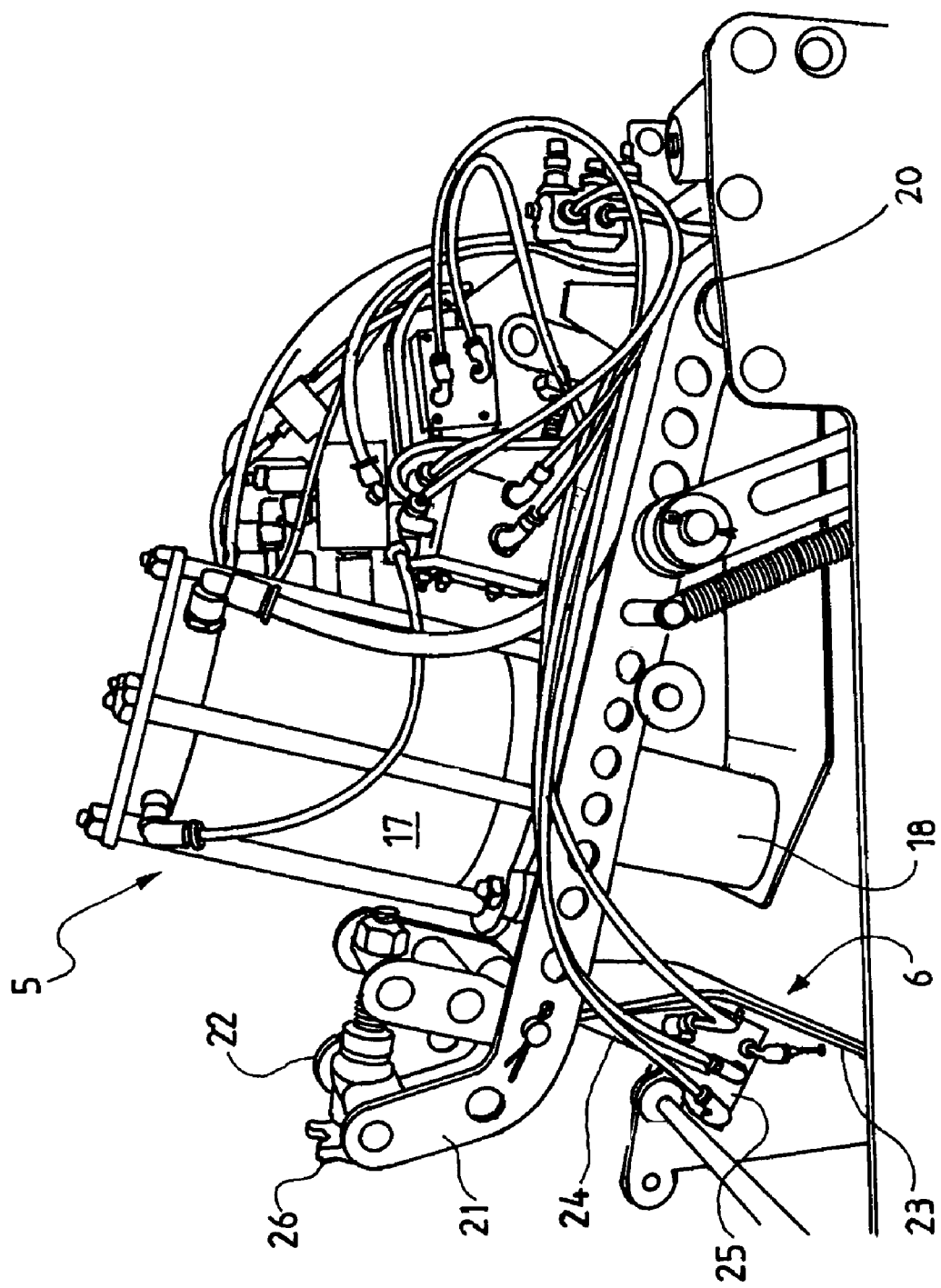
FIG. 2 is a perspective side view of the device shown in FIG. 1 in which the pneumatic gun assembly and trigger assembly in the retracted position can be seen.

FIG. 2 provides a side view of gun assembly 5 when at a retracted position—i.e. post firing. Gun assembly 5 has an pneumatic cylinder 17 and a sleeve 18 from which a striker 19 (not shown) extends for stunning a fish on firing. The assembly is pivotally mounted to a shaft 20 across channel 2 by a pair of rails 21 and 22. Trigger assembly 6 is pivotally mounted to the rails. This assembly includes a contact plate 23 which is pivotal within the assembly and an arm 24 to which trigger valve 25 is mounted. The position of contact plate 23 relative to striker 18 can be adjusted by turning screw 26.

Figure 3:
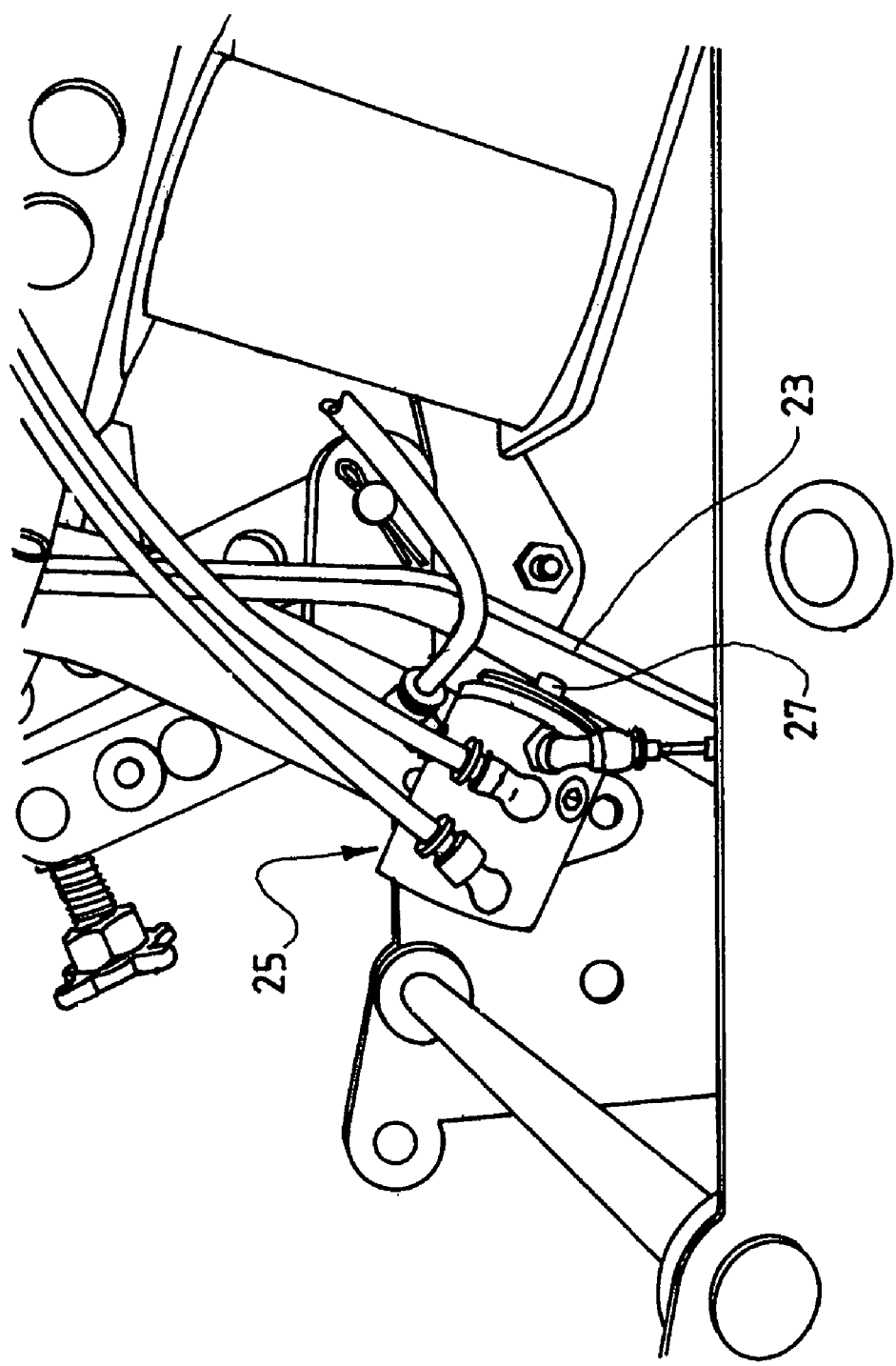
FIG. 3 is a perspective side view of the device of FIG. 1 in which the trigger assembly can be seen in greater detail.

With reference to FIG. 3 there is shown piston rod 27 of trigger valve 25 that is contiguous with contact plate 23. Piston rod 27 is locked in the extended position after activation of fish processing means 5 and 9.

Figure 4:
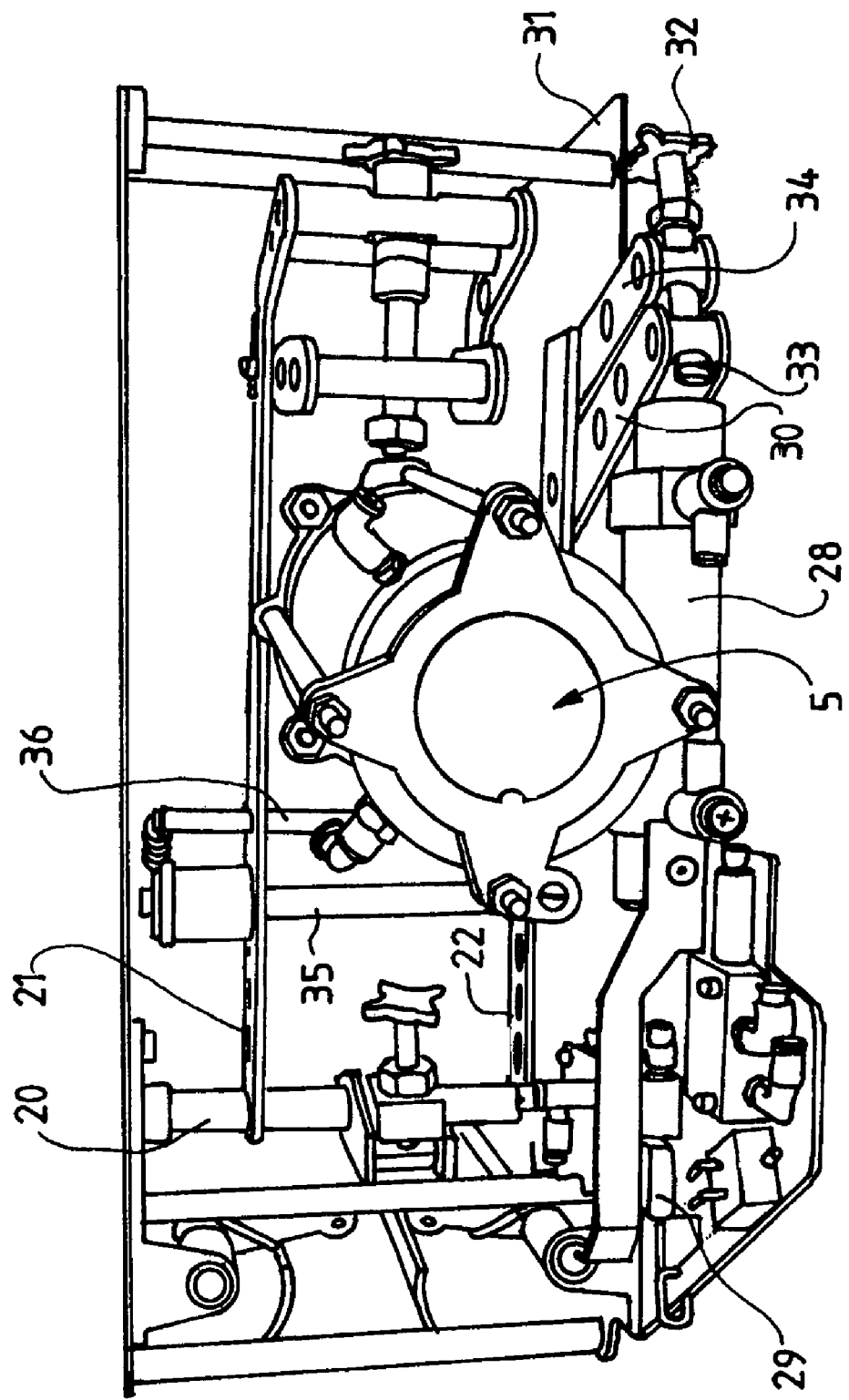
FIG. 4 is a perspective view of the device of FIG. 1 from above.

FIG. 4 provides a plan view of the device 1. This view shows double acting pneumatic lift cylinder 28 which controls the pivoting of gun assembly 5, vertical guide plates 3 and 4 (not shown) and blade assembly 9 (not shown) which is attached to chin plate 8 (not shown). Lift cylinder 28 is connected between a crank 29 associated with shaft 20 and an arm 30 pivotally connected to a plate on side wall 31. The position of arm 30—and hence the position of the gun piston at firing—is set by adjusting screw 32 between distal end 33 of arm 30 and a fixed member 34 extending upwardly from side wall 31.

Figure 5:
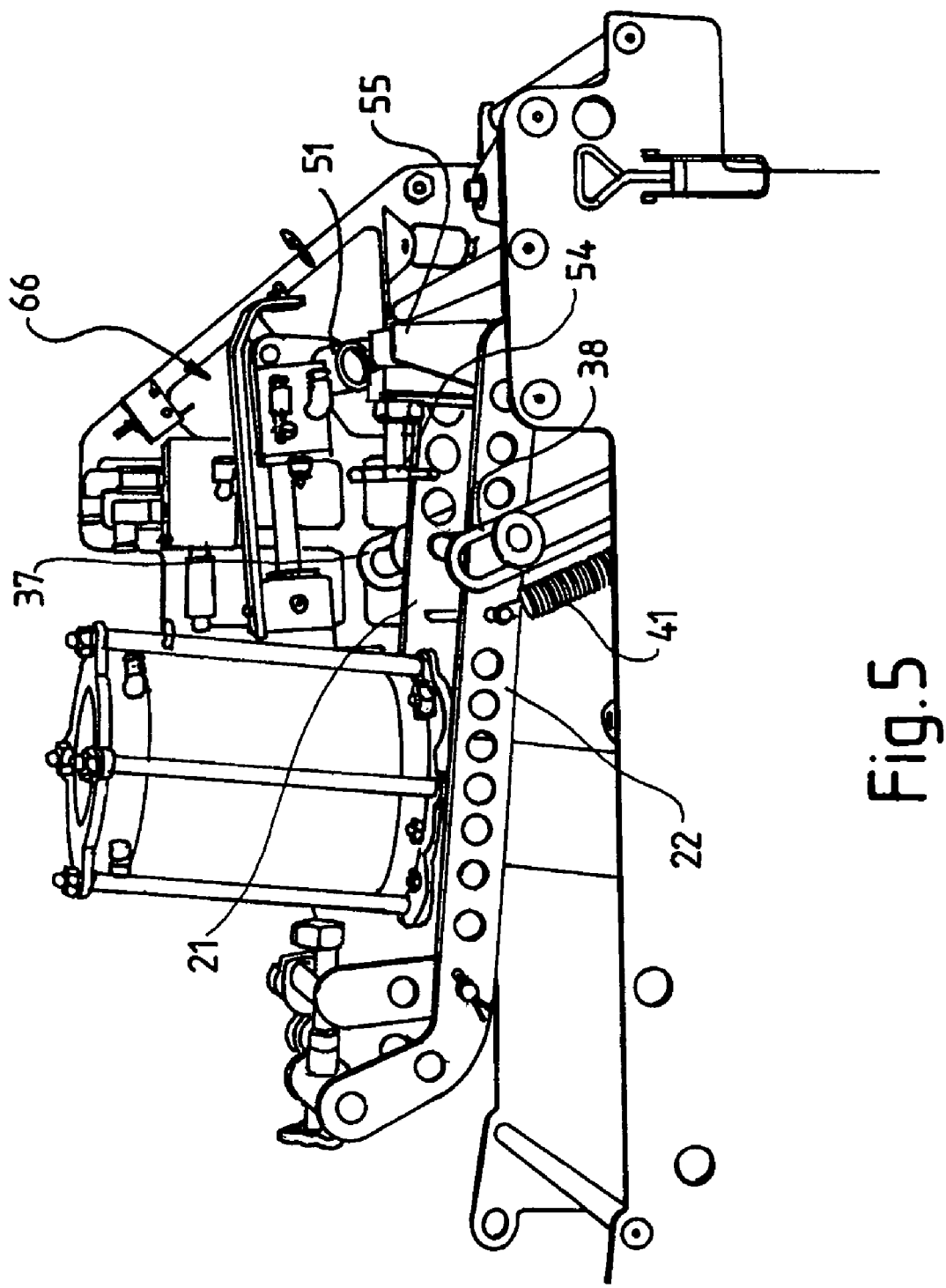
FIG. 5 is a further perspective view of the device of FIG. 1 from the side of the device.
Figure 6:
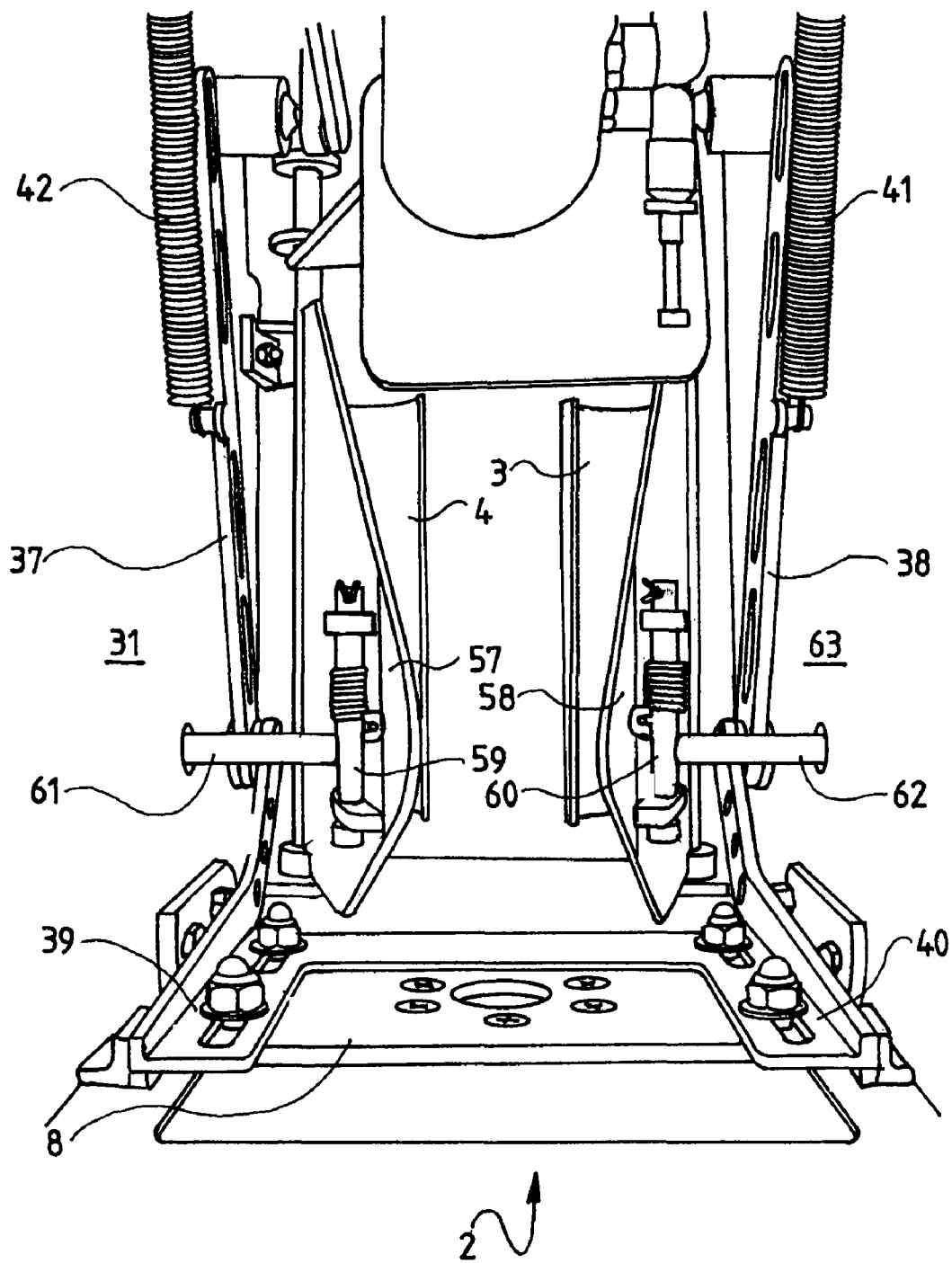
FIG. 6 is a perspective view of the device of FIG. 1 from the exit of the channel in which the pivoting mechanisms can be seen in greater detail.

Elements of the device for effecting pivoting can be appreciated from FIGS. 4, 5 and 6. With reference to FIG. 4, it can be seen that a shafts 35 and 36 are provided across rails 21 and 22. With reference to FIG. 5, it is shown that the ends of shafts 35 and 36 are located in slots in the ends of links 37 and 38 to opposing rails 39 and 40 mounted to the chin plate 8 (refer to FIG. 6). Springs 41 and 42 are connected between a point on links 37 and 38, respectively, to a second shaft 36 (refer to FIG. 4) spanning rails 21 and 22. These springs bias the chin plate towards the retracted position and override the play resulting from the slots in the ends of links 37 and 38.

Figure 7:
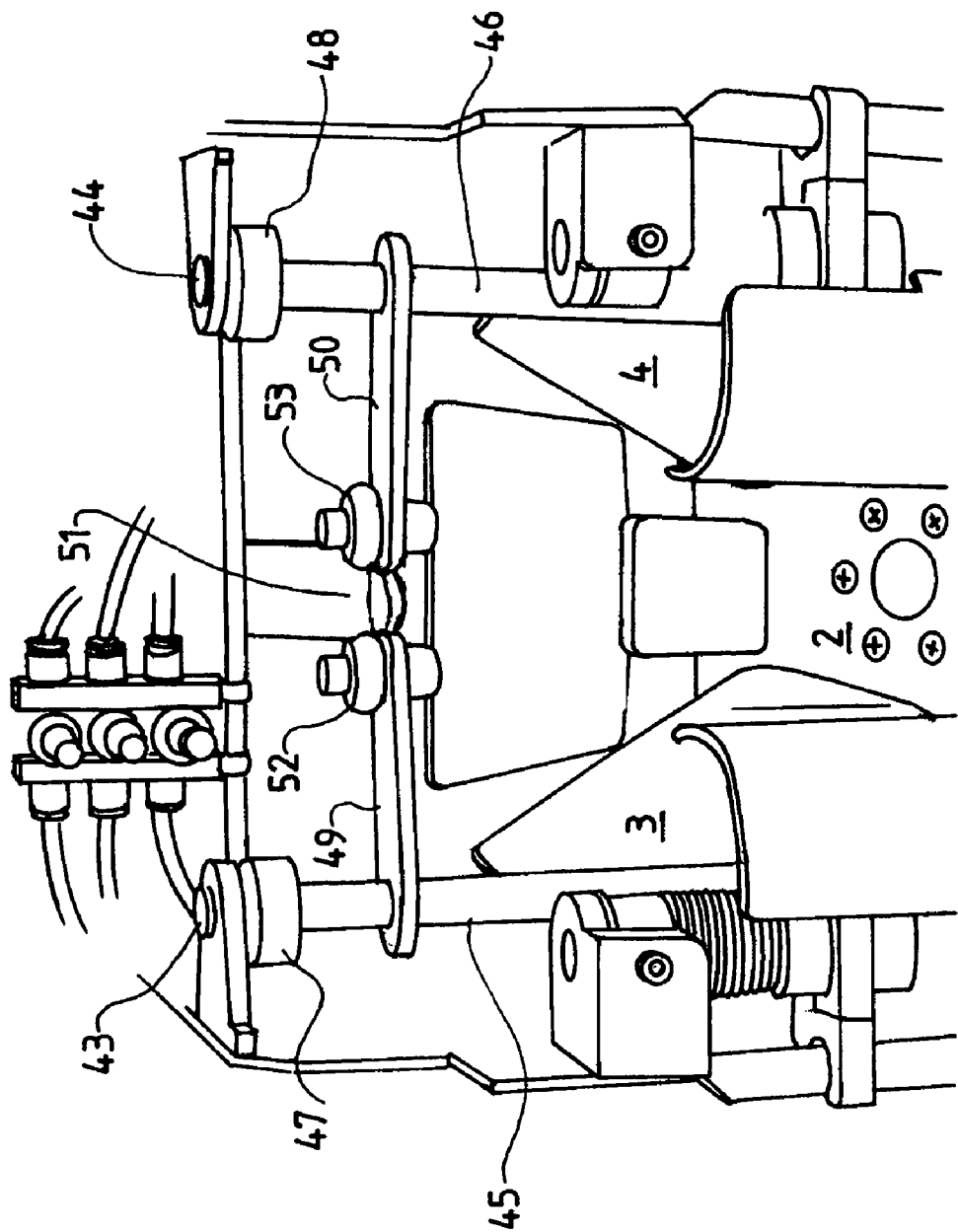
FIG. 7 is a perspective view of the device of FIG. 1 from the entrance to the channel in which the crank assembly controlling the movement of the vertical guide plates can be seen in greater detail.

With reference to FIG. 7, ends 43 and 44 of shafts 45 and 46 on guide plates 3 and 4 within channel 2 are journalled to bearings 47 and 48 at the top of the channel and bearings in the floor of the channel (not visible in the figures). Cranks 49 and 50 attached to shafts 45 and 46 are pivotally linked to crank 51 on shaft 20 (not shown) of the gun assembly pivot (see FIG. 4) by couplings 52 and 53.

The operation of a guide plate is as follows. On pivoting upward of the gun assembly after firing, shafts 45 and 46 are rotated by the linkage to the gun assembly via couplings 52 and 53, and cranks 49 and 50. The rotation of shafts 45 and 46 thus also rotates guide plates 3 and 4 until they lie close to parallel with side wall 31 of the channel of the device. Pivoting of the gun assembly to the set (firing) position forces the guide plates to return to the firing position. Adjustment of the distance between the ends of the guide plates distal their shafts is effected by a screw 54 which sets the position of crank 51 on shaft 20 (see FIGS. 5 and 7). Such adjustment is necessary to accommodate fish of different widths. Crank 51 can actually freely rotate on shaft 20. Co-rotation of crank 51 with shaft 20 is effected by a fixed member 55 (refer to FIG. 5) on the shaft which contacts the crank through adjustment screw 54. As a result of this the guide plates always open to be parallel to the sides of the channel but without restricting the upward pivoting of gun assembly 5.

The chin plate 8 is shown in FIG. 6. Chin plate 8 is connected to a shaft 56 (not shown) and journalled to bearings not shown in the drawing in the side walls of the channel. A crank extends away from each end of the shaft, one of which cranks is item 39. Crank 39 is pivotally connected to an end of link 37.

On upward rotation of the gun assembly, it will be appreciated that chin plate 8 is rotated because of the action of link 37 on crank 39. This causes the chin plate to lie essentially flat against the floor aiding passage of a fish beyond the set point after firing of the gun. As noted above, the slots in the links compensate for the different position of shaft 35 (see FIG. 4) relative to chin plate 8 with adjustment of the position of gun assembly 5.

With reference to FIG. 6, clamping plates 57 and 58 are pivotally mounted to guide plates 3 and 4. The guide plates are spring biased towards a release position. In the release position, a clamping plate is co-planar with a guide plate. Pivot rods 59 and 60 are connected to fetter rods 61 and 62, that control the extent to which the guide and clamp plates extend into channel 2. Rods 61 and 62 travel through the side walls 31 and 63 of channel 2 when the plates move to the retracted position. A pneumatic clamping cylinder 64 comprises a rod 65 (not shown) that is connected to crank 51. Activation of clamping cylinder 64, and the concomitant extension of rod 65 sets the position of crank 51 on shaft 20 such that the guide and clamp plates move from the set position to a clamping position. This results in the clamping of the fish before processing. In the clamp position, the surface of clamping plates 57 and 58 are forced against the body of the fish, thus ensuring that the body of the fish proximal to the clamp plate pivots 59 and 60, is vertical and centred in channel 2.

Figure 8:
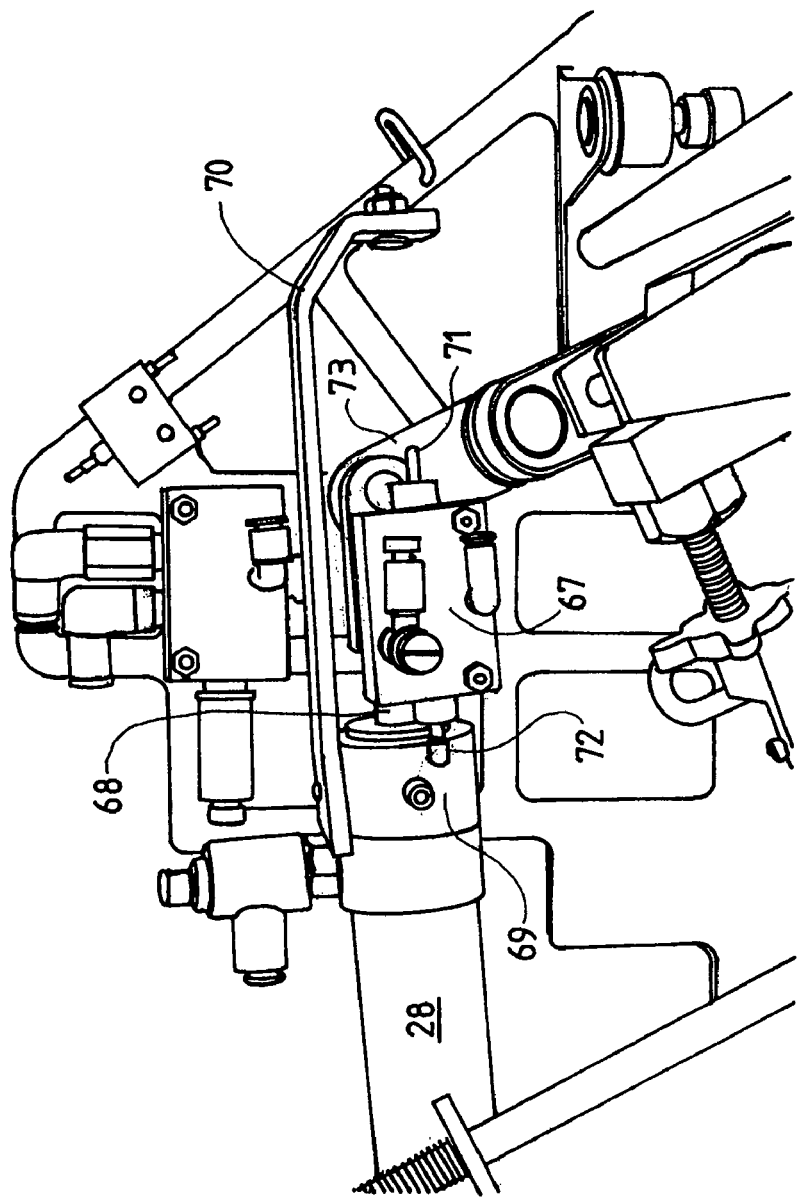
FIG. 8 is a perspective side view of the reset assembly.

FIG. 8 provides a side view of reset assembly 66 (refer to FIG. 5), which comprises reset valve 67, extendable piston rod 68 of pneumatic lift cylinder 28, and contact plates 69 and 70. Reset valve 67 comprises a rod 71 that reciprocates between a primed and activated position. The termini of rod 71, 72 and 73 contact plates 69 and 70, respectively. In the primed position terminus 72 contacts plate 69. After activation of fish processing means 5 and 9, activation of lift cylinder 28 causes rod 68 to extend. When the piston of lift cylinder 28 is at or near the top of its stroke, terminus 73 contacts plate 70 resulting in the reciprocation of said rod to the activated position.

Figure 9:
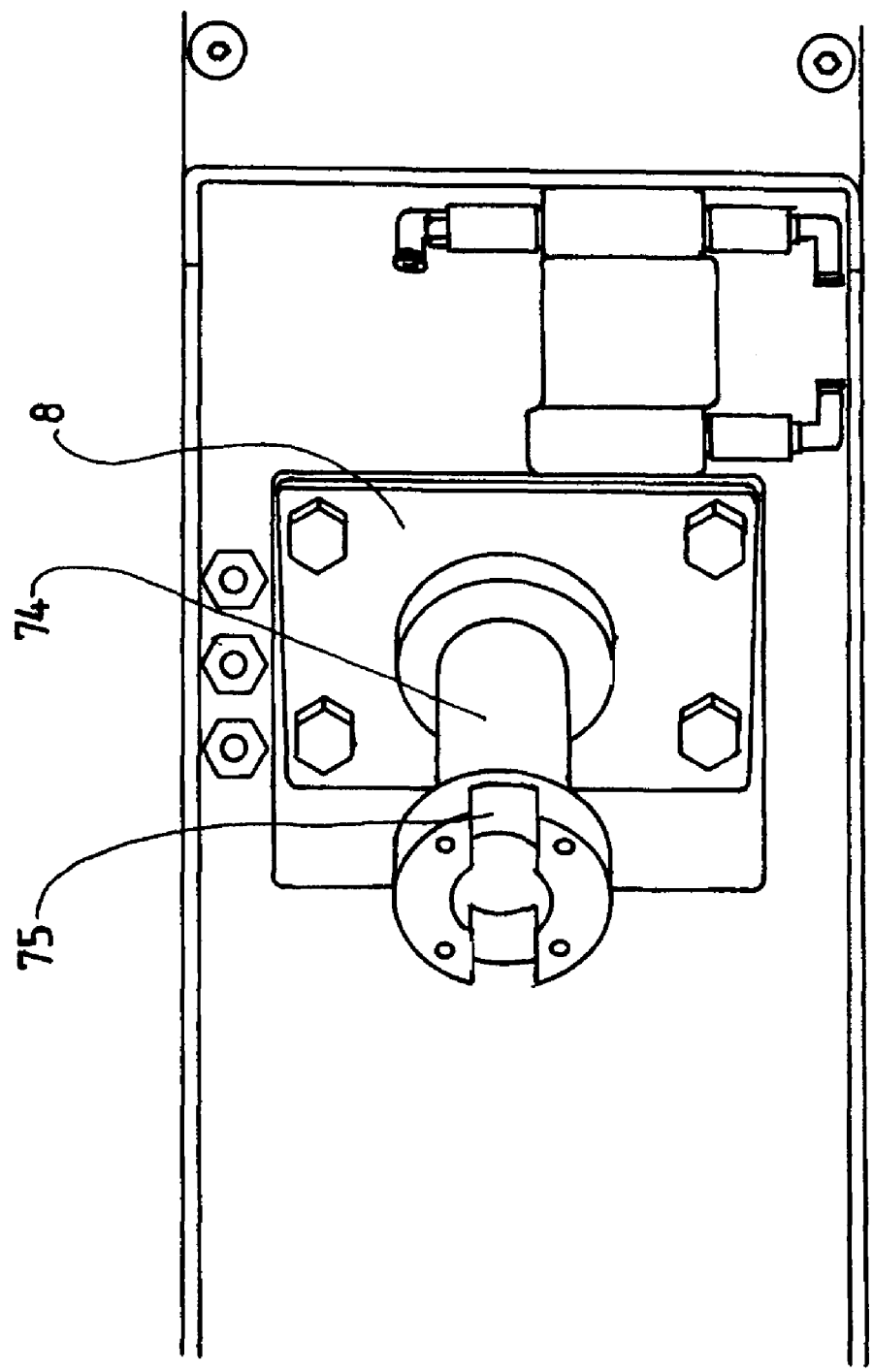
FIG. 9 is a perspective view of the device of FIG. 1 showing the under-side of the device in which part of the blade assembly is shown.

FIGS. 9 and 10 provide plan views of the components comprising pneumatic blade assembly 9. With reference to FIG. 9 there is shown the under-side of chin plate 8 to which blade sheath 74 is attached. Blade sheath 74, comprises a channel 75 which houses bade 10. FIG. 10 shows blade 10 attached to shaft 76 which is driven by impact cylinder 77. The cutting surface of blade 10, item 78 is detachable from shaft 76.

The device components described above are controlled and operated pneumatically. Device 1 thus includes regulators for supplying air to the various components of the device at a suitable pressure (typically 400 to 700 kPa).

The channel of the device is typically covered when in use to prevent operator injury through contacting the moving parts of the device. The cover is advantageously pivotally mounted to the channel and includes a safety lock which shuts off air supply to the device when the cover is lifted.

Figure 11:
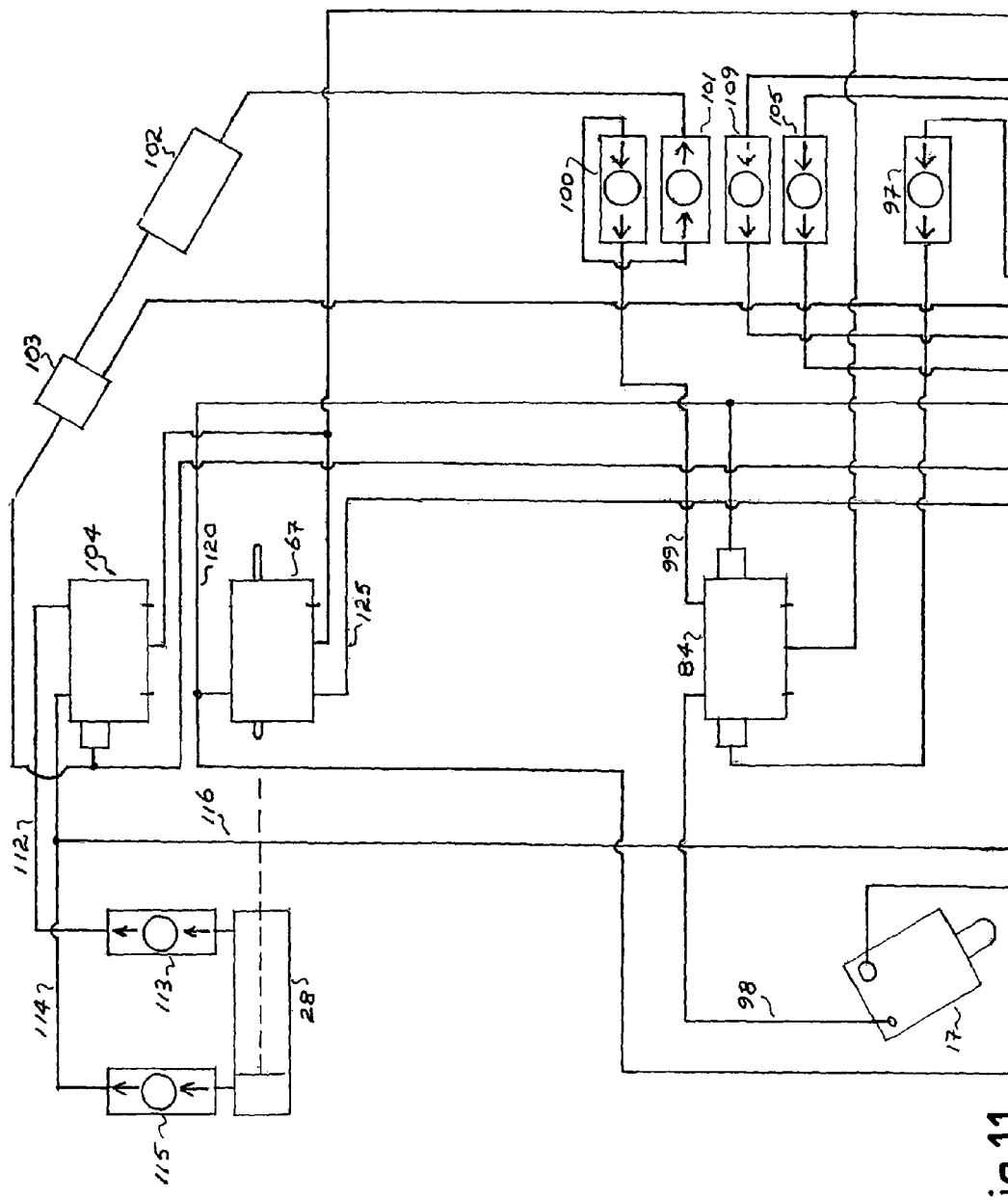
FIG. 11 is a schematic representation of a pneumatic control circuit of an exemplified device.
Figure 11:
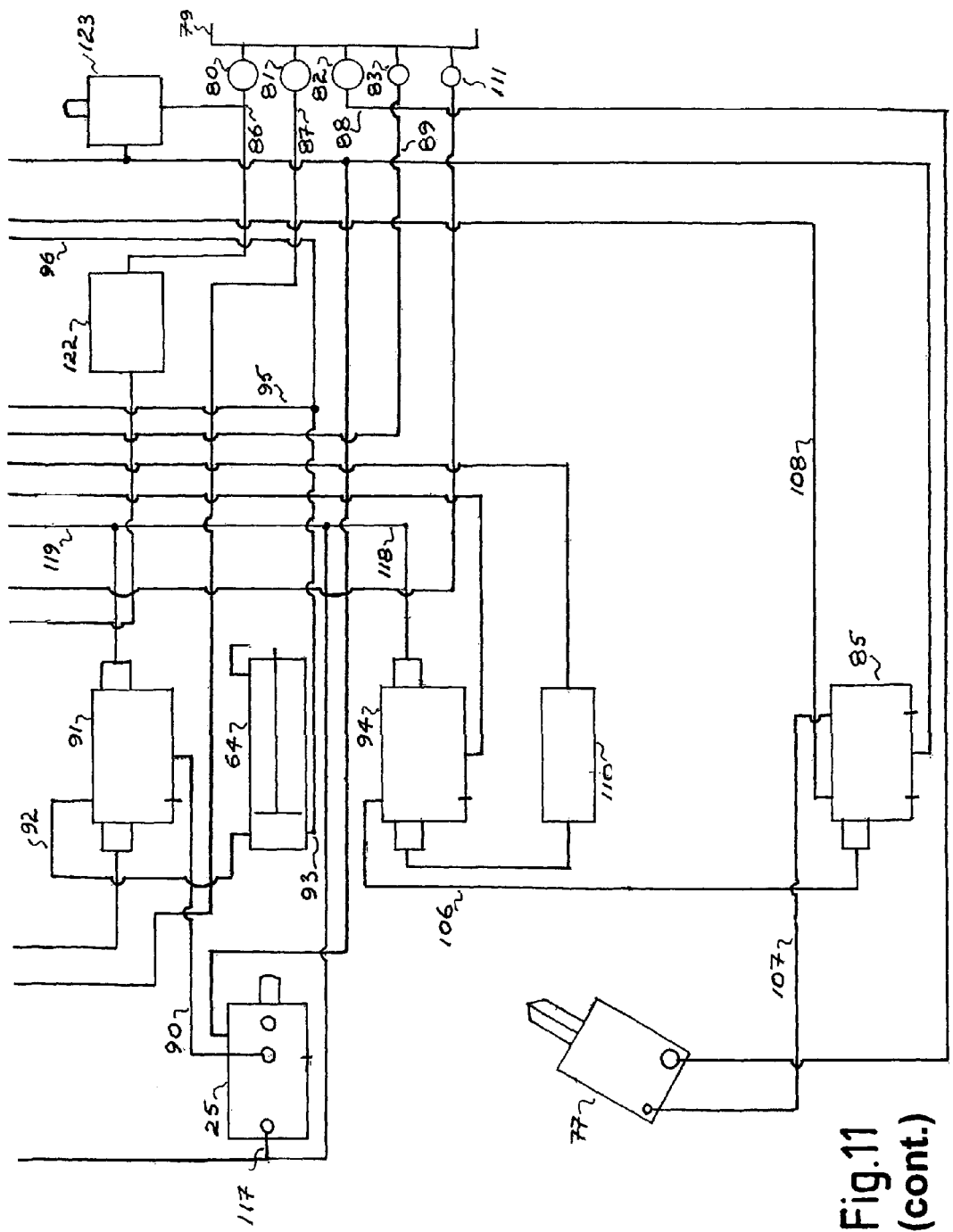

The pneumatic control circuitry of the device is depicted in FIG. 11. The circuitry comprises an air supply 79 for manual over-ride control 80, hammer control 81, blade control 82, and over-ride control 83 which supply air to pneumatic cylinders 17 and 77, reset valve 67 (see also FIG. 8), hammer valve 84, blade cylinder valve B (85) and trigger valve 25. These components are supplied by lines 86 to 89, respectively. Arrows depicted in the diagram indicate the direction in which air flow can be controlled.

Activation of Clamping Cylinder 64 and Firing of Pneumatic Cylinders 17 and 77.

Before activation of the device trigger valve 25 is in a primed state. Activation of trigger valve 25 by the actuation of contact plate 23 by the nose of the fish switches trigger valve 25 from the primed state to an activated state. In the activated state trigger valve 25 facilitates the flow of air in line 90 which leads to clamp valve 91 which is in a primed state. When in the primed state clamp valve 91 directs air via line 92 to clamp cylinder 64 which in turn facilitates the movement of side plates 3 and 4 from the release position to the clamp position. Air in clamping cylinder 64 is shared with line 93, which bifurcates and thereby directs air to hammer valve 84 and blade cylinder valve A (94) via lines 95 and 96, respectively. Air directed through line 95 proceeds via hammer delay 97 to hammer valve 84, causing said hammer valve 84 to switch from a primed state to an activated state. When in the activated state, hammer valve 84 facilitates:

(i) the venting of air from pneumatic cylinder 17 through line 98. Venting of air from pneumatic cylinder 17 causes the firing of striker 19 onto the head of the fish causing death; and (ii) the movement of air via line 99, lift and return delay controls 100 and 101, reservoir 102, and OR valve 103 to lift valve 104 which controls the movement of guide plates 3 and 4, pneumatic gun assembly 5 and blade assembly 9.

Air directed through line 96, proceeds via blade delay control 105 to blade cylinder valve A (94) which is in a primed state. In the primed state said valve 94 directs air to blade cylinder valve B (85) through line 106. Air pressure directed into valve 85 through line 106, switches said valve from a primed state to an activated state. In the activated state:

(i) said valve facilitates the venting of air from pneumatic cylinder 77 via line 107 causing blade 10 to enter the fish; and (ii) directs air into line 108 via blade return delay 109 and reservoir 110 to blade cylinder valve A (94) which causes said valve 94 to switch from the primed position to an activated position.

When blade valve 94 is in the activated position, said valve facilitates the venting of air in line 106. Loss of air pressure in line 106 causes spring loaded blade cylinder valve B (85) to return to the primed position, thereby applying air pressure to pneumatic cylinder 77 and facilitating the concomitant retraction and priming of blade 10. It will also be appreciated that it is advantageous for the blade to be extracted from the fish before clamping plates 57 and 58 move from the clamp to release position. If this were not the case a processed fish would be prevented from exiting the channel. It will also be appreciated that blade delay control 109 can be adjusted by the operator to control the interval between activation of pneumatic cylinders 17 and 77.

Deactivation of Clamping Cylinder 64 and Activation of Lift Cylinder 28.

Engorgement of line 99 by the activation of hammer valve 84 results in the flow of air to lift valve 104 and counter 111. Air entering lift valve 104 from hammer valve 84 via line 99 switches said valve from a primed position to an activated position. In the activated position said valve facilitates:

(i) the venting of air from lift cylinder 28 via line 112 and flow control 113; and (ii) the flow of air to:
   (a) lift cylinder 28 via line 114 and flow control 115; and
   (b) clamp valve 91 via line 116.

Pressure in line 116 causes clamp valve 91 to switch from the primed state to an activated state. In the activated state said valve facilitates the venting of pressure in clamping cylinder 64 via line 92. This results in the movement of clamping plates 57 and 58 from the clamp to release position. It will be appreciated that flow to and from lift cylinder 28 via lines 112 and 114 facilitates the activation of lift cylinder 28 which in turn facilitates the pivoting of said side plates and pneumatic cylinders 17 and 77. Flow controls 113 and 115 are biased such that the rate at which compressed air exits lift cylinder 28 can be regulated. By adjusting controls 113 and 115 it is possible to control the time taken for the side plates and fish processing means 5 and 9 to move from the firing position to the retracted position and vice versa. It will also be appreciated that deactivation of clamp cylinder 28 and the concomitant movement of clamping plates 57 and 58 from the clamp to release position occurs before the activation of lift cylinder 28.

Actuation of Reset Valve 67 when Side Plates 3 and 4 and Pneumatic Cylinders 17 and 77 Have Attained a Retracted Position.

When vertical guide plates 3 and 4 and pneumatic cylinders 17 and 77 have attained a retracted position, reset valve 67 is actuated resulting in the switching of said valve from a primed state to an activated state. In the activated state said valve directs air flow into lines 117, 118, 119 and 120, which are connected to trigger valve 25, blade cylinder valve A (94), hammer valve 85, and clamp valve 91, respectively.

Air entering trigger valve 25 via line 117 causes said valve to switch from the activated state to the primed state. This transition involves the movement of trigger valve piston 121 (not shown) from the activated position to the primed position. It will be appreciated that pressure in line 117 prevents the depression of piston 121 and the premature activation of said pneumatic cylinders, clamp cylinder and lift cylinder. It will also be appreciated that at this stage trigger valve 25 is effectively locked.

Air entering blade cylinder valve A (94) via line 118 causes said valve to switch from the activated state to the primed state.

Air entering hammer valve 84 via line 119 causes said valve to switch from the activated state to the primed state. In the primed state:
 (i) venting of air from pneumatic cylinder 17 via line 98 is stopped resulting in retraction of striker 19 and
 (ii) air pressure in line 99 is vented through said valve causing lift valve 104 to switch from the activated state to the primed state. In the primed state lift valve 104 reverses the flow of air into lines 112 and 114 deactivating lift cylinder 28 which in turn causes guide plates 3 and 4 and pneumatic cylinders 17 and 77 to pivot from a retracted position to the firing position.

Air entering clamp valve 91 via line 120 switches said valve from the activated state to the primed state. It will be appreciated that when trigger valve 25 is in the primed state air in line 90 is vented from said valve. It will also be appreciated that when piston 27 of trigger valve 25 is depressed by contact plate 23 air pressure is applied through lines 90 and 92 thereby activating clamp cylinder 64.

Resetting of Reset Valve 67 when Vertical Guide Plates 3 and 4 and Pneumatic Cylinders 17 And 77 have Attained the Set Position.

When vertical guide plates 3 and 4 and pneumatic cylinders 17 and 77 have attained the set position reset valve 67 is actuated resulting in the switching of said valve from the activated state to the primed state. In the primed state air flow into lines 117, 118, 119 and 120, is blocked and air in these lines is vented through manual reset valve 122 via reset valve 67. It will be appreciated that once the plates 3 and 4 and pneumatic cylinders 17 and 77 have attained the firing position and reset valve 67 has been actuated the circuit has effectively been reset and the device is ready to process another fish.

Manual Over-Ride Mechanisms

Lid valve 123 and manual reset valve 122 act as manual over-ride controls. Lid valve 123 is connected to channel cover 124 (not shown in the figures), such that when said cover is opened by the operator, air supply to pneumatic cylinders 17 and 77, reset valve 67 (see also FIG. 8), hammer valve 84, blade cylinder valve B (85) and trigger valve 25 is blocked thereby rendering the device inoperable. It will be appreciated that lid valve 123 is a safety feature that aims to prevent injury to the operator.

Manual reset valve 122 is connected to reset valve 67. Activation of reset valve 122 directs air via line 125 to reset valve 67, causing valve 67 to switch to the primed state. In the primed state, air flows into lines 117, 118, 119 and 120, thereby resetting valves 25, 67, 85, 91 and 94. The circuit has effectively been reset and the device is ready to process a fish.

The operation of the device is described in the following paragraphs.

a) Prior to admission of a fish, gun assembly 5, vertical guide plates 3 and 4, and blade assembly 9 are at the firing position. Trigger valve 25 is primed.
b) On entering the device, a fish advances to the set point which is where the nose of the fish meets contact plate 23 of trigger assembly 6 which in turn activates trigger valve 25.
c) Activation of trigger valve 25 results in the following sequence:
  1. Activation of pneumatic clamp cylinder 64 and hence clamping of the fish;
  2. activation of pneumatic cylinder 17 so that striker 19 stuns the fish;
  3. activation of pneumatic cylinder 77 so that blade 10 can sever the fish's arteries;
  4. retraction of blade 10 from the fish and channel 2
  5. de-activation of clamp cylinder 64 and the release of the fish;
  6. activation of lift cylinder 28 resulting in coincidental pivoting of the gun assembly 5, the vertical guide plates and the blade assembly to their retracted positions (essentially adjacent to the channel walls or floor).
d) Passage of the processed fish past the set point and out of the device.
e) Actuation of reset valve 67 when piston rod 68 of lift cylinder 28 is at the end of its stroke resulting in:
  (i) deactivation of lift cylinder 28 resulting in the coincidental pivoting of the gun assembly, the vertical guide plates and the blade assembly to the set position.
  (ii) deactivation of trigger valve 25 so that premature activation of the device does not occur if the contact plate strikes the processed fish during its downward trajectory.
f) Actuation of reset valve 67 when rod 68 of lift cylinder 28 is at or near the end of its stroke resulting in: priming of pneumatic cylinder 17, trigger valve 25, valves 91 and 94. It will be appreciated that steps (a) to (d) represent a complete cycle which is repeated for the stunning of further fish.

Figure 12:
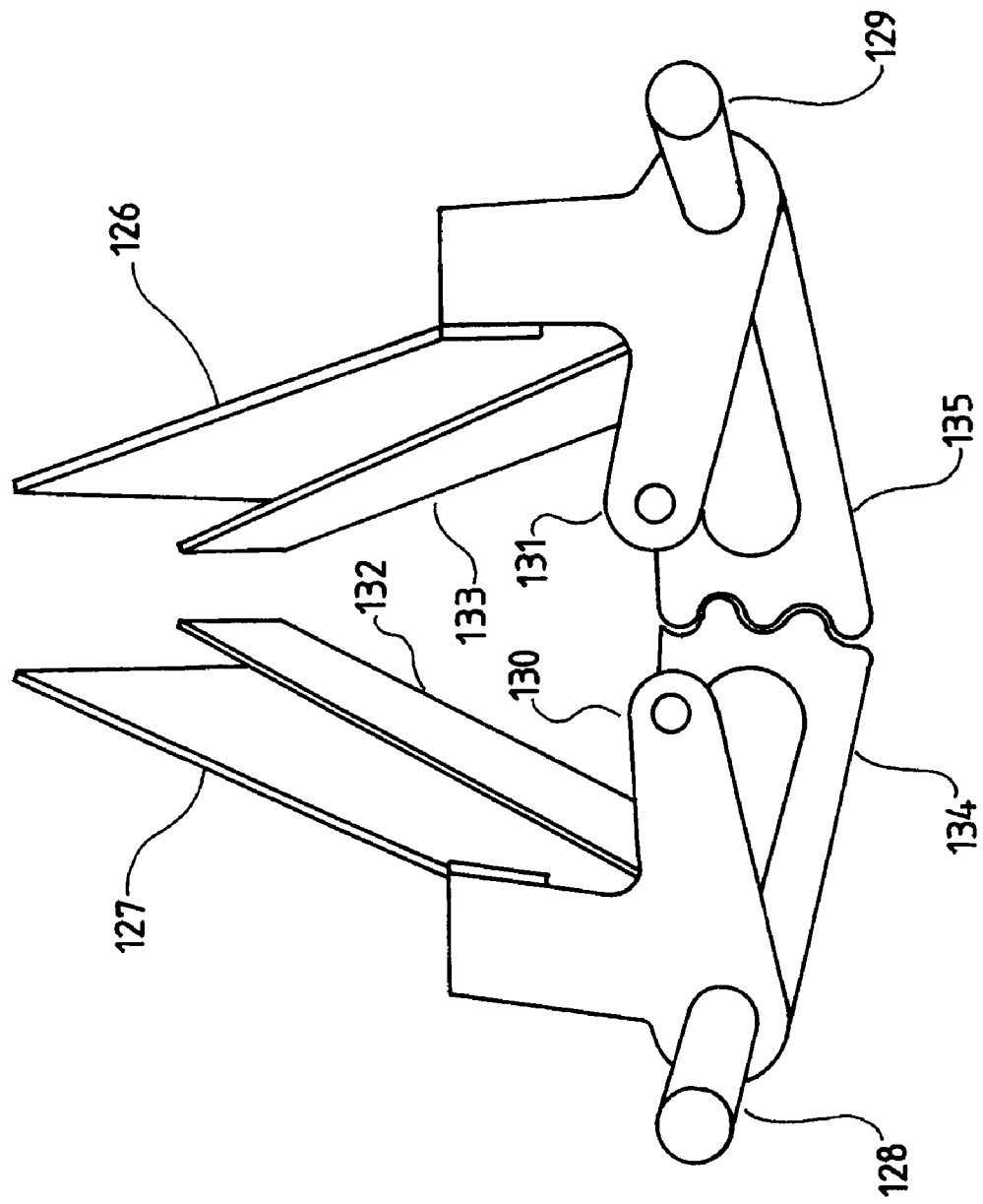
FIG. 12 is a perspective view of a clamping means according to a preferred embodiment of the invention.
Figure 13:
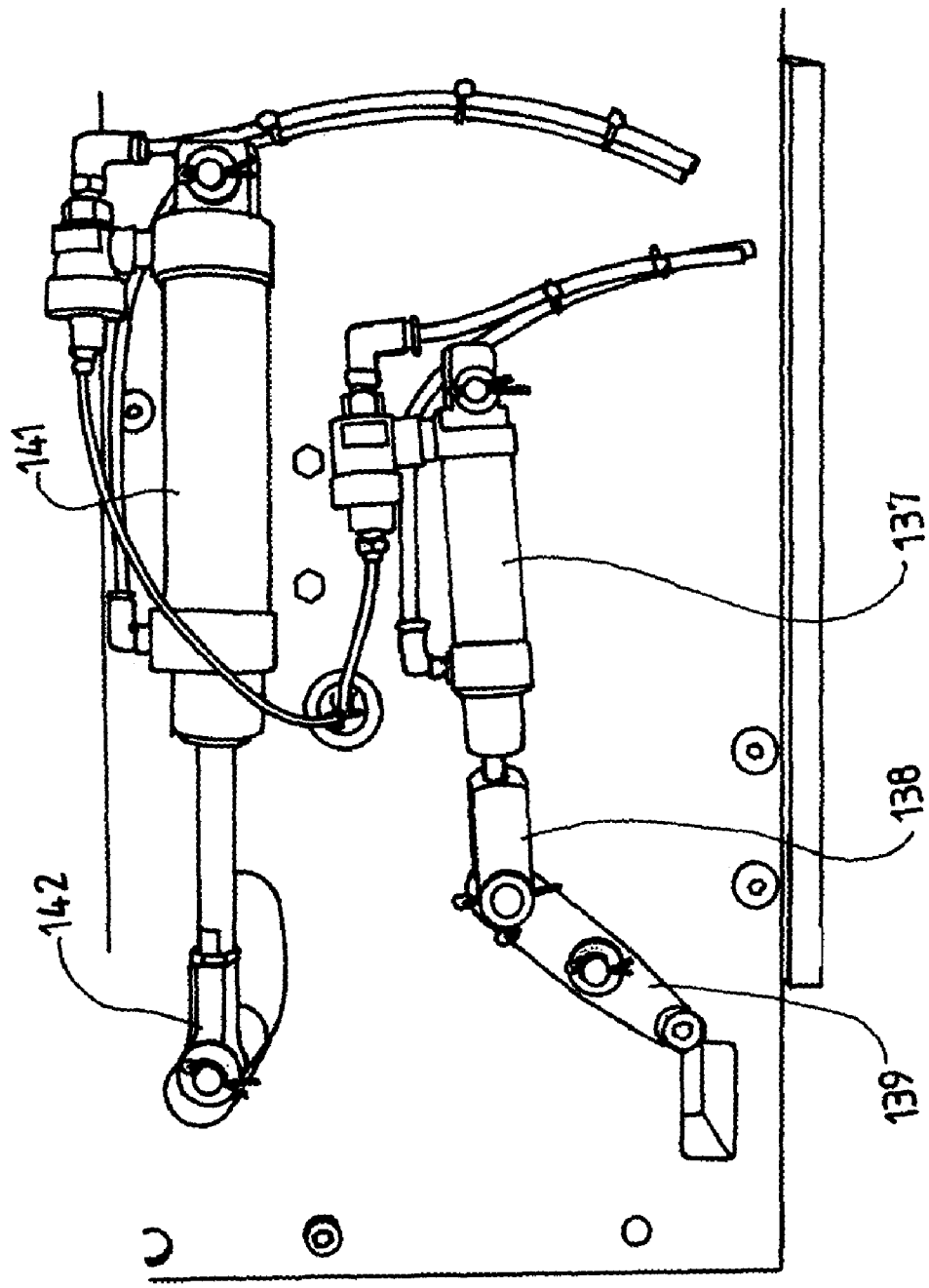
FIG. 13 is a side view of a device according to a preferred embodiment of the invention showing a clamping actuator means and a locking means.

In FIG. 12 there is shown vertical guide plates 126 and 127 pivotally mounted on shafts 128 and 129. Each vertical guide plate comprises a crank 130 or 131 that is pivotally linked to crank 51 on shaft 20 of the gun assembly pivot by one of couplings 52 or 53. It will be appreciated that shafts 128 and 129 correspond to either shaft 45 or 46. Each vertical guide plate is associated with a clamping member 132 or 133 in the from of a vertical plate that is pivotally mounted to the same shaft as the vertical guide plate. Each clamping member comprises a toothed bracket 134 and 135. A crank 136 (not shown) is suitably positioned on clamping member 134. Opposing clamping members are arranged so that the teeth of each bracket intermesh. It will be appreciated that in this configuration, the clamping members pivot relative to one another such that pivoting of one clamping member towards the centre of the channel results in the concomitant pivoting of the other clamping member towards the centre of the channel so that the clamping members contact a fish. With reference to FIG. 13 there is shown a pneumatic ram 137 that controls the pivoting of the clamping members. An end of pneumatic ram 138 is connected to lever 139 which in turn is connected to crank 136 via coupling 140 (not shown). In the extended position, pneumatic ram 137 turns lever 139 which in turn acts on coupling 140 to pivot clamping member 134. Pivoting of clamping member 134, by the action of coupling 140 on crank 136, results in the concomitant movement of clamping member 135 towards the centre of the channel or until it contacts a fish. It will be appreciated that the concomitant movement of clamping member 135 is facilitated by the interaction of opposing toothed brackets 134 and 135.

Figure 14:
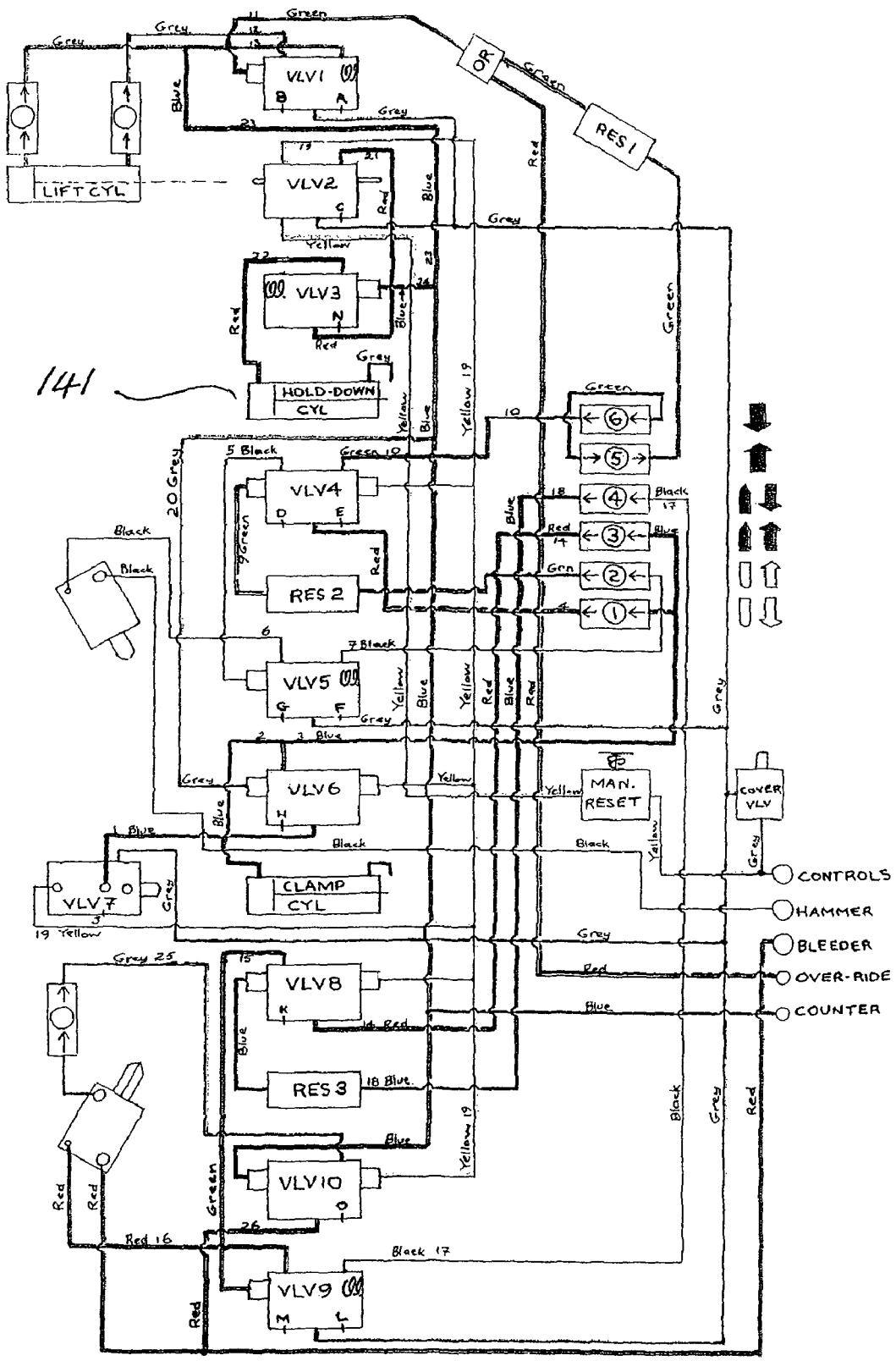
FIG. 14 is a schematic representation of a pneumatic control circuit, showing inter alia, the circuitry associated with the locking means.

FIG. 13 also shows a locking means comprising a pneumatic ram 141 an end of which 142 is connected to fixed member 55 which controls the pivoting of gun assembly 5. It will be appreciated that pneumatic ram 141 is locked in an extended position when the gun is primed for firing and is free to retract after the gun has fired so as to allow the gun assembly 5 to pivot to the retracted position. It will also be appreciated that in the extended position ram 141 prevents fixed member 55 from pivoting gun assembly 5. With respect to FIG. 14 there is shown a pneumatic circuit which comprises pneumatic ram 141. It will be appreciated by one of skill in the art that the pneumatic circuit of the device, as described in FIG. 14, suitably controls the locking and retraction of pneumatic ram 141 at a defined step in the fish processing cycle. The steps of the processing cycle governed by the pneumatic circuit of FIG. 14 will also be appreciated by one of skill in the art.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

Any reference to publications cited in this specification is not an admission that the disclosures constitute common general knowledge in Australia.

The invention claimed is:

1. A device for processing fish, the device comprising:
   an elongate member comprising a floor and opposing side walls forming an open channel through which a fish can pass;
   at least one fish processing means associated with the channel, wherein the at least one fish processing means includes a member which can act on the body of the fish when at a set point in the channel, and wherein said at least one fish processing means is selected from the group consisting of means for stunning a fish, means for ex-sanguinating a fish, means for gutting a fish, means for inoculating a fish, means for tagging a fish, means for scaling a fish, means for cleaning a fish, and combinations thereof;
   a vertical guide plate pivotally mounted on each side of the channel, having a firing position, wherein an end of a guide plate distal the pivotal mounting is at or near the set point and the pivotal mounting is between the set point and a channel entrance, and a retracted position, wherein each guide plate is near parallel to a side wall of the channel;
   a mechanism for moving at least the member of the at least one fish processing means from a firing position at or near the set point to a retracted position which allows passage of the fish through the channel after being acted on by the member;
   a mechanism for pivoting each guide plate between the firing and retracted positions;
   a trigger that when contacted by the head of the fish at the set point activates the member of the at least one fish processing means; and
   a mechanism for resetting the device after the processing of a fish, wherein the resetting mechanism is in communication with the trigger and wherein actuation of the mechanism by the trigger facilitates:
   activation of the at least one fish processing means;
   movement of at least the member of the at least one fish processing means and guide plates from their respective firing positions to their respective retracted positions;
   return of at least the member of the at least one fish processing means and the guide plates to the firing position after the at least one fish processing means and guide plates have attained the retracted position; and
   priming of the at least one fish processing means.

2. The device of claim 1, wherein the guide plate pivot mechanism is an integral part of, or at least associated with, the mechanism for moving at least the member of the at least one fish processing means.

3. The device of claim 2 further comprising a mechanism for pivoting the chin plate between a raised and a lowered position, wherein in the raised position the plate supports the chin of the fish and in the lowered position the plate rests flat against the floor of the channel allowing the fish to be carried on through the channel.

4. The device of claim 3, wherein the mechanism for pivoting the chin plate is an integral part of, or at least associated with, both the guide plate pivot mechanism and the mechanism for moving the least member of the at least one fish processing means.

5. The device of claim 1 further comprising a lateral and upwardly angled chin plate which is abutted by the chin of the fish when at the set point.

6. The device of claim 5, wherein a fish processing means is an integral part, or at least associated with, the chin plate.

7. The device of claim 6, wherein the fish processing means is a blade.

8. The device of claim 1, wherein the mechanism for moving at least the member of the at least one fish processing means is a pivoting mechanism that pivots said member from the firing position to the retracted position and vice versa.

9. The device of claim 7, wherein the blade is a spike driven by a pneumatic cylinder.

10. The device of claim 1, wherein a fish processing means is a gun.

11. The device of claim 1, wherein a fish processing means is a blade.

12. The device of claim 1 comprising two fish processing means, a gun and a blade.

13. The device of claim 1 further comprising a clamping means, wherein the clamping means retains a fish in a dorso-ventral orientation along the centre of the channel.

14. The device of claim 13, wherein the clamping means comprises:
   at least two opposing clamping members mounted in said channel; and
   an actuator means that facilitates the reciprocation of said clamping members between a release position and a clamp position wherein in the clamp position a clamping member is adjacent the surface of the body of the fish.

15. The device of claim 14, wherein a clamping member is a vertical plate.

16. The device of claim 1, wherein the resetting mechanism is in the form of a circuit and the circuit comprises:
at least one fish processing means;
a clamping actuator means;
a lifting means that is in communication with the mechanism for pivoting the vertical guide plates and the mechanism for moving the least the member of the at least one fish processing means;
a trigger switch that is in communication with the trigger, which when actuated by the trigger causes activation of:
the clamping actuator means;
the at least one fish processing means; and
the lifting means such that the least member of the at least one fish processing means moves and vertical guide plates pivot from their respective firing positions to their respective retracted positions;
a reset switch that is actuated when the at least one fish processing means and vertical guide plates are at or near their respective retracted positions or at or near their respective firing positions, wherein actuation of said switch at or near the retracted positions results in:
de-activation of the lifting means such that the least member of the at least one fish processing means moves and the vertical guide plates pivot from their respective retracted positions to their respective firing positions; and
de-activation of the trigger switch such that said switch is prevented from activating the clamping actuator means, the at least one fish processing means and the lifting means; and wherein actuation of the reset switch at the firing position causes:
re-activation of the trigger switch; and
the priming of the at least one fish processing means.

17. The device of claim 16, wherein the lifting means is a double acting pneumatic ram comprising a piston, wherein the piston comprises an extendable rod, a distal end of which is attached to the reset switch such that movement of the reset switch is coextensive with the movement of the distal end of the rod and wherein the reset switch is actuated when the piston is at or near the end of each stroke, and wherein actuation of the reset switch involves contact between the switch and a contact plate, wherein the contact plate is located at or near a position attained by the distal end of the piston rod after each stroke of the piston.

18. The device of claim 16, wherein the circuit is pneumatic.

19. The device of claim 16, wherein the trigger switch is a pneumatic valve comprising:
a piston to which a rod is attached, wherein the piston travels within a sheath formed by the valve between a primed position and an activated position, wherein at the primed position:
the distal end of the rod extends from the valve and is contacted by the trigger; and
the piston is locked in the primed position until the least member of the at least one fish processing means and vertical guide plates are at or near their respective firing positions;
and wherein actuation of the trigger by the head of the fish results in the movement of the piston from the primed position to the activated position causing:
activation of the at least one fish processing means; and
activation of the mechanism for moving the least member of the at least one fish processing means and the vertical guide plate pivot mechanism.

20. The device of claim 16, wherein the reset switch is a pneumatic valve comprising a moveable rod, which reciprocates between a first position and a second position, whereupon attainment of the first position causes:
the unlocking of the trigger valve such that said valve can activate the at least one fish processing means; and
whereupon attainment of the second position causes:
activation of the lifting means such that the least member of the at least one fish processing means moves and the vertical guide plates pivot from their respective retracted positions to their respective firings position; and
the locking of the trigger valve such that said valve is prevented from activating the at least one fishing processing means.

21. The device of claim 16, wherein the circuit further comprises at least one time delay mechanism that controls at least one of:
the time between activation of the trigger switch and activation of the at least one fish processing means;
the time between activation of the trigger switch and the activation of the clamping actuator means;
the time between activation of the at least one fish processing means and activation of the lifting means;
the time taken for the least member of the at least one fish processing means to move and the vertical guide plates to pivot from their respective firing positions to their respective retracted positions; and
the time taken for the least member of the at least one fish processing means to move and the vertical guide plates to pivot from their respective retracted positions to their respective firing positions.

22. The device of claim 21, wherein the circuit comprises the following time delay mechanisms:
the time between activation of the trigger switch and activation of the at least one fish processing means;
the time between activation of the trigger switch and the activation of the clamping actuator means;
the time between activation of the at least one fish processing means and activation of the lifting means;
the time taken for the least member of the at least one fish processing means to move and the vertical guide plates to pivot from their respective firing positions to their respective retracted positions; and
the time taken for the least member of the at least one fish processing means to move and the vertical guide plates to pivot from their respective retracted positions to their respective firing positions.

23. The device of claim 16, wherein the trigger comprises a contact plate that is in communication with the trigger switch.

24. The device of claim 16, wherein the clamping actuator means is in communication with the guide plate pivot mechanism, such that activation of the actuator means causes the vertical guide plates to move from the set point towards the centre of the channel.

25. The device of claim 1 further comprising two opposing members that aid in the presentation of a fish along its dorsal-ventral axis to the at least one fish processing means.

26. The device of claim 25, wherein said opposing members are plates that are pivotally mounted at or near the entrance to the channel.

27. The device of claim 26, wherein the plates are arciform.

28. A method of processing a fish comprising the step of allowing a fish to pass through a device according to claim 1.

29. The method of claim 1 comprising the steps of stunning and ex-sanguinating a fish.

30. The method of claim 29 wherein the step of stunning is performed before the step of ex-sanguinating a fish.

* * * * *